United States Patent
Frankel et al.

(10) Patent No.: US 10,476,815 B2
(45) Date of Patent: Nov. 12, 2019

(54) ADAPTIVE COMMUNICATION NETWORK WITH CROSS-POINT SWITCHES

(71) Applicant: Ciena Corporation, Hanover, MD (US)

(72) Inventors: Michael Y. Frankel, Bethesda, MD (US); Vladimir Pelekhaty, Baltimore, MD (US); John P. Mateosky, West River, MD (US)

(73) Assignee: Ciena Corporation, Hanover, MD (US)

( * ) Notice: Subject to any disclaimer, the term of this patent is extended or adjusted under 35 U.S.C. 154(b) by 50 days.

(21) Appl. No.: 15/837,014

(22) Filed: Dec. 11, 2017

(65) Prior Publication Data

US 2019/0182180 A1    Jun. 13, 2019

(51) Int. Cl.
*H04L 12/933* (2013.01)
*H04L 12/801* (2013.01)
*H04L 12/70* (2013.01)
*H04L 12/935* (2013.01)

(52) U.S. Cl.
CPC .......... *H04L 49/101* (2013.01); *H04L 47/11* (2013.01); *H04L 49/3009* (2013.01); *H04L 2012/5609* (2013.01)

(58) Field of Classification Search
None
See application file for complete search history.

(56) References Cited

U.S. PATENT DOCUMENTS

| | | | |
|---|---|---|---|
| 8,054,840 B2 | 11/2011 | Booth et al. | |
| 9,124,383 B1 | 9/2015 | Frankel et al. | |
| 10,205,629 B2* | 2/2019 | Ma | H04L 41/0631 |
| 2004/0228278 A1* | 11/2004 | Bruckman | H04L 47/10 370/231 |
| 2006/0252106 A1* | 11/2006 | Malinowski | C07K 14/4738 435/7.23 |
| 2007/0053368 A1* | 3/2007 | Chang | H04L 41/065 370/401 |
| 2008/0075071 A1 | 3/2008 | Beshai | |
| 2009/0003206 A1* | 1/2009 | Bitar | H04L 45/245 370/230.1 |
| 2009/0080328 A1* | 3/2009 | Hu | H04L 65/4084 370/230 |
| 2009/0141622 A1* | 6/2009 | Bitar | H04L 41/0896 370/225 |

(Continued)

OTHER PUBLICATIONS

Singla et al., "Jellyfish: Networking Data Centers Randomly," arXiv:1110.1687v3 [cs.NI] Apr. 20, 2012.

(Continued)

*Primary Examiner* — Kevin D Mew
(74) *Attorney, Agent, or Firm* — Clements Bernard Walker; Christopher L. Bernard; Lawrence A. Baratta, Jr.

(57) ABSTRACT

A cross-point switch system forming an adaptive communication network between a plurality of switches includes a plurality of ports connected to the plurality of switches, wherein the plurality of switches are connected to one another via a Port Aggregation Group (PAG) comprising multiple ports with a same set of endpoints between two switches; and a cross-point switch fabric configured to connect the plurality of ports between one another, wherein the cross-point switch fabric is configured to rearrange bandwidth in a PAG due to congestion thereon without packet loss.

20 Claims, 18 Drawing Sheets

(56) References Cited

U.S. PATENT DOCUMENTS

| | | | |
|---|---|---|---|
| 2009/0141731 A1* | 6/2009 | Bitar | H04L 45/245 370/412 |
| 2010/0182920 A1* | 7/2010 | Matsuoka | H04L 43/00 370/252 |
| 2010/0329147 A1* | 12/2010 | Nam | H04L 45/00 370/254 |
| 2011/0158113 A1* | 6/2011 | Nanda | H04L 12/185 370/252 |
| 2011/0280124 A1* | 11/2011 | Unger | H04L 41/04 370/230 |
| 2012/0026878 A1* | 2/2012 | Scaglione | H04L 41/0816 370/235 |
| 2013/0108259 A1 | 5/2013 | Srinivas et al. | |
| 2013/0108263 A1 | 5/2013 | Srinivas et al. | |
| 2013/0108264 A1 | 5/2013 | Deruijter et al. | |
| 2013/0117449 A1 | 5/2013 | Hares et al. | |
| 2013/0287397 A1 | 10/2013 | Frankel et al. | |
| 2013/0322244 A1* | 12/2013 | Matthews | H04L 49/251 370/235 |
| 2013/0322443 A1 | 12/2013 | Dunbar et al. | |
| 2014/0119193 A1* | 5/2014 | Anand | H04L 45/28 370/237 |
| 2014/0153924 A1 | 6/2014 | Deruijter et al. | |
| 2014/0198649 A1* | 7/2014 | Jain | H04L 47/41 370/235 |
| 2014/0229944 A1 | 8/2014 | Wang et al. | |
| 2014/0270762 A1 | 9/2014 | Li et al. | |
| 2015/0003464 A1* | 1/2015 | Zhang | H04L 41/083 370/400 |
| 2015/0076923 A1 | 3/2015 | Frankel et al. | |
| 2015/0263990 A1* | 9/2015 | Inoue | H04L 45/245 709/226 |
| 2015/0319646 A1* | 11/2015 | Zhou | H04L 49/70 370/237 |
| 2016/0065458 A1* | 3/2016 | Ye | H04L 12/462 370/410 |
| 2016/0173384 A1* | 6/2016 | Zhu | H04L 12/6418 370/236 |
| 2017/0048147 A1* | 2/2017 | Vaidya | H04L 47/125 |
| 2017/0126478 A1* | 5/2017 | Morris | H04L 41/0654 |
| 2017/0230294 A1* | 8/2017 | Saksena | H04L 47/12 |
| 2017/0302577 A1* | 10/2017 | Worth | H04L 45/7453 |
| 2018/0007455 A1* | 1/2018 | Mehrvar | H04L 49/25 |
| 2018/0123980 A1* | 5/2018 | Frankel | H04L 49/15 |
| 2019/0075043 A1* | 3/2019 | Selvaraj | H04L 45/245 |

OTHER PUBLICATIONS

Jyothi et al., "Measuring and Understanding Throughput of Network Topologies," arXiv:1402.2531v3 [cs.NI] Feb. 9, 2015.

Farrington et al., Helios: A Hybrid Electrical/Optical Switch Architecture for Modular Data Centers, SIGCOMM'10, Aug. 30-Sep. 3, 2010, New Delhi, India. Copyright 2010 ACM 978-1-4503-0201-Feb. 10, 2008.

Broadcom, HighDensity 25/100 Gigabit Ethernet StrataXGS® Tomahawk Ethernet Switch Series BCM56960 Series, accessed Oct. 21, 2015.

Koibuchi et al., "Layout-conscious Random Topologies for HPC Off-chip Interconnects," The 19th International Symposium on High-Performance Computer Architecture (HPCA), Feb. 2013.

Doyle, "Lessons from Altoona: What Facebook's newest data center can teach us," Network World (http://www.networkworld.com/) on Apr. 14, 2015.

Calient, "LightConnect™ Fabric Virtual Pod Data Centers," http://www.calient.net/solutions/lightconnectfabricvirtualpod-datacenters/, accessed Oct. 21, 2015.

* cited by examiner

ADAPTIVE COMMUNICATION NETWORK WITH CROSS-POINT SWITCHES

FIELD OF THE DISCLOSURE

The present disclosure generally relates to networking systems and methods. More particularly, the present disclosure relates to an adaptive communication network implemented using cross-point switches.

BACKGROUND OF THE DISCLOSURE

Conventionally, networks in data centers, High-Performance Computing (HPC), and the like are built with rigidly structured architectures. Some examples known in data center networks are Fat Tree (Clos), Dragonfly, Slim Fly, and B-Cube. Specifically, a Fat Tree or Clos network is frequently used in modern data centers. These networks suffer from some well-known problems. First, there is increased latency due to many hops, especially as the number of layers grows with structured network architectures. High network loads can produce filled switch buffers, increasing latency. Second, structured network architectures are deployed in discrete implementation sizes, and higher layer ports may go unused in an underfilled network. FIG. 1 is a network diagram of a three-layer leaf-spine folded-Clos network 10 with various switches 12 interconnecting servers 14. Of note, the Clos network 10 is used to draw comparisons with the systems and methods described herein. As an example, with the three-layer (L=3) Clos network 10 using k-port switch, the following relationships between port count and server and switch counts exist: k=24→servers=3456, switches=720; k=32→servers=8192, switches=1280; k=64→servers=65536, switches=5120. For Clos Computations (k-port switches, L switching layers): the number of layers required: $L=\log(N_{serv}/2)/\log(k/2) \sim \log(N_{serv})/\log(k)$; the number of servers: $N_{serv}=k*(k/2)*(k/2) \ldots =2*(k/2)^L$. The total switch count is: $N_{switch}=(2L-1)*(k/2)^{(L-1)}$.

Third, structured network architectures have difficulty in horizontal scaling by requiring multiple layers. Horizontal scaling is explained as follows. In general, hardware devices such as Application Specific Integrated Circuits (ASICs) are port limited by available pins. This means bandwidth can increase, but usually, most increases are achieved by increasing port speeds such as 25G to 56G, i.e., port counts are difficult to increase. However, port counts determine horizontal fan-out capability such as in the Clos network 10. Therefore, network horizontal scale growth will eventually face problems in terms of network layer increases. Each layer requires interconnect, which requires high power backplanes and/or expensive optics. Fourth, structured network architectures are susceptible to cluster-packing problems which confine processing jobs within clusters to reduce latency and improve efficiency. However, the processor (CPU), storage, etc. resources in the cluster must then be sized to anticipate large loads and can often be underutilized when the loads are smaller.

Fifth, the number of required Application Specific Integrated Circuit (ASIC) increases super-linearly as number of layers increases causing further problems. The capacity increase experienced in the data center networks is far outpacing what the semiconductor industry is able to offer from packet switch ASIC bandwidth growth. And this problem is likely to be exacerbated in the future such as due to 5G wireless networks, the proliferation of Internet of Things (IoT) devices, and edge cached content with massive replication all of which continue driving huge data bandwidth. At the same time, complementary metal-oxide-semiconductor (CMOS) lithography and packaging pin limits constrain packet ASIC bandwidth growth. A solution is needed that avoids the high port count (i.e., Radix) requirements being placed on packet switch ASICs. One approach to solving the packet ASIC Radix problem is to stack multiple ASICs into larger boxes. For example, one implementation has a 12×ASIC count increase for a corresponding 4× port increase, but this is inefficient as the port increase is 3× less than the overall ASIC count increase.

Another previously proposed approach is to use optical switching in the data center. One example includes an architecture provided by Plexxi with highly structured optical interconnects as well as electrical switching. There are numerous challenges with this approach including the physical topology limited to ring-type configurations, a small number of direct interconnects between nodes, scaling problems, bandwidth limitations on each network connection, centralized control, and the like. Another example includes all-optical switching where optical switches establish direct optical connections with long persistence between predefined sets of servers or racks. This approach is useful for cases where applications understand their hardware environment and can anticipate bandwidth requirements, but this approach requires centralized control limiting its utility.

Yet another conventional approach is to use optical circuit switches as a bypass to offload traffic from core packet switches. Here, electronic packet switches used in upper network layers can be made smaller. However, given the slow nature of optical circuit switching, it naturally targets large flows. Top of Rack (TOR) switches group smaller flows with many destinations into the electrical core. Larger, more persistent flows go through pre-configured optical direct connect paths. This approach requires very tight coordination between the application layer which is aware of its upcoming bandwidth demands and the networking layer which provides reconfigurable bandwidth. Given the latency and granularity, this approach is only useful for very large and persistent application bandwidth demands.

As data center networks continue to grow, there is a need to rethink the network architecture to address the aforementioned limitations. The aforementioned conventional solutions all focus on a "better box" (e.g., higher port count, density, etc.) or a "better software app" (e.g., centralized control, etc.). These solutions are ineffective to address the large-scale growth in the data center network, and a more comprehensive approach is needed.

BRIEF SUMMARY OF THE DISCLOSURE

In an embodiment, a cross-point switch system forming an adaptive communication network between a plurality of switches includes a plurality of ports connected to the plurality of switches, wherein the plurality of switches are connected to one another via a Port Aggregation Group (PAG) including multiple ports with a same set of endpoints between two switches; and a cross-point switch fabric configured to connect the plurality of ports between one another, wherein the cross-point switch fabric is configured to rearrange bandwidth in a PAG due to congestion thereon without packet loss. The multiple ports in the PAG are filled in a sequential order by the switches to keep ports free to rearrange the bandwidth. The adaptive communication network can be a packet network with the plurality of switches including packet switches at edges and the cross-point switch system in-between. Each the plurality of switches can be connected to a small subset of the plurality of switches in a mesh network configuration. The cross-point switch system can be configured to detect which ports are carrying traffic and which are empty and used to rearrange the bandwidth. The cross-point switch system can detect the ports based on an IDLE signal transmitted by a switch on a port. The cross-point switch system can detect congestion on a PAG, determine if there is available bandwidth to expand the PAG, rearrange the bandwidth to expand the PAG, and notify associated switches to adjust the PAG. The cross-point switch system can be implemented using a plurality of cross-point switches with inter-switch coordination to provide link occupancy rates.

In another embodiment, a packet switch in an adaptive communication network includes a plurality of ports including network-facing ports connected to additional packet switches in the adaptive communication network via a cross-point switch system and server-facing ports connected to servers, wherein the network-facing ports are connected to each of the additional packet switches via a Port Aggregation Group (PAG) including multiple ports; and a switch fabric configured to switch packets between the plurality of ports, wherein the switch fabric is configured to provide packet flows to each port in a PAG in an order to fill up port queue to a specified threshold before using next available port to keep ports free to rearrange the bandwidth. The cross-point switch system can be configured to rearrange bandwidth in a PAG due to congestion thereon without packet loss. The adaptive communication network is a flat-topology packet network with the packet, the additional packet switches, and another set of packet switches at edges and the cross-point switch system in-between. The packet switch is connected to a small subset of packet switches including the additional packet switches in a mesh network configuration and connected to the another set of packet switches via multiple hops. The cross-point switch system can be configured to detect which ports are carrying traffic and which are empty and used to rearrange the bandwidth. The packet switch can be configured to transmit an IDLE signal on a port without traffic to the cross-point switch system. The cross-point switch system can detect congestion on a PAG, determine if there is available bandwidth to expand the PAG, rearrange the bandwidth to expand the PAG, and notify the packet switch to adjust the PAG. The cross-point switch system can be implemented using a plurality of cross-point switches with inter-switch coordination to provide link occupancy rates.

In a further embodiment, a method implementing an adaptive communication network between a plurality of packet switches includes connecting the packet switches to one another with each pair of packet switches interconnected in a Port Aggregation Group (PAG) including multiple ports; communicating over each PAG by filling each of the multiple ports to a specified queue threshold before using next available port to keep ports free to rearrange the bandwidth; and, responsive to congestion on a PAG, rearranging bandwidth to add one or more ports to the congested PAG. The adaptive communication network is a flat-topology packet network with the packet switch, the additional packet switches, and another set of packet switches at edges and the cross-point switch system in-between. The method can further include detecting free ports available to rearrange the bandwidth based on an IDLE signal transmitted thereon. The method can further include dynamically adjusting the PAG for bandwidth management without centralized control.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
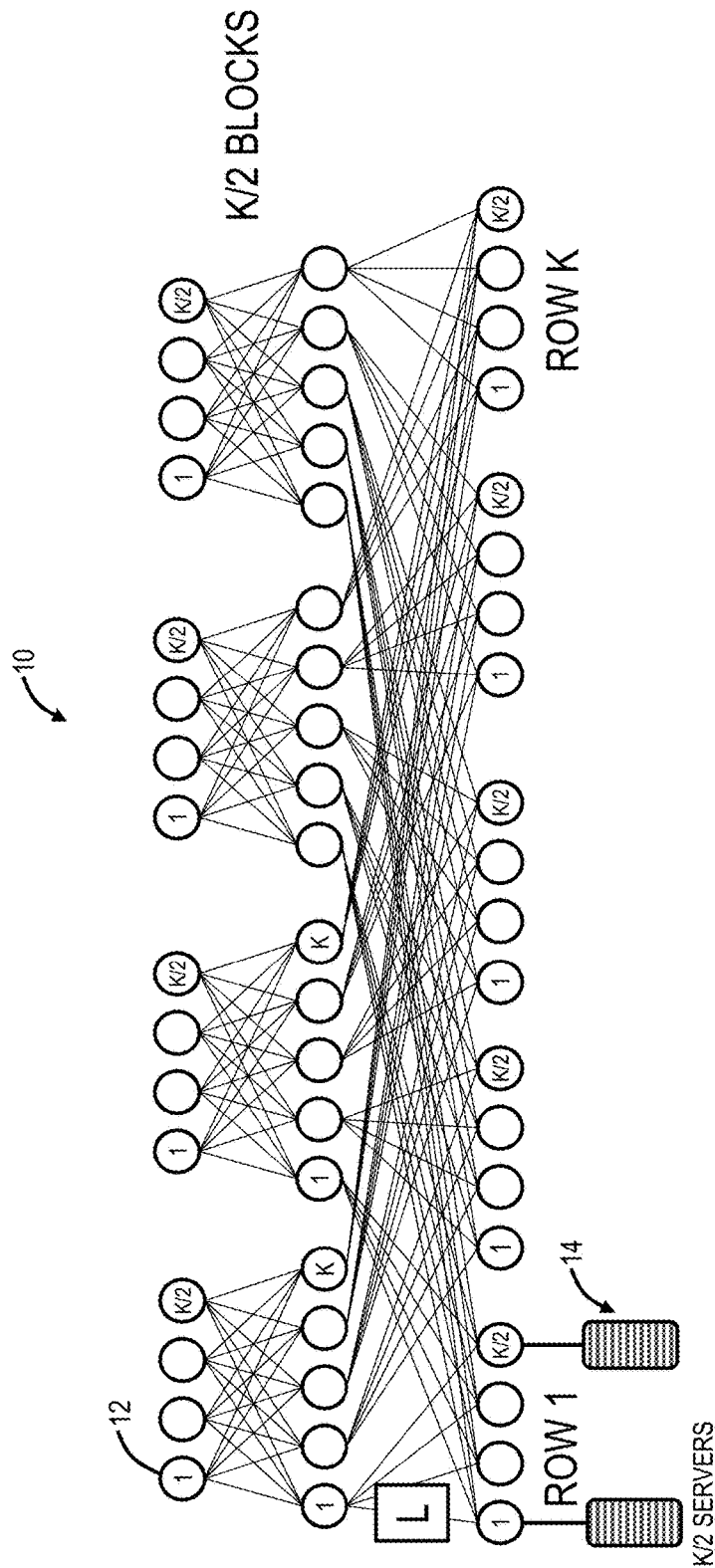
FIG. 1 is a network diagram of a three-layer leaf-spine folded-Clos network with various switches interconnecting servers.

In various embodiments, the present disclosure relates to an adaptive communication network implemented using cross-point switches. The adaptive network is a flat-topology packet network with packet processing and buffering only at the edges, i.e., TOR switches, with a pure circuit switch layer interconnecting the TOR switches, i.e., the cross-point switches. Thus, the adaptive communication network has no packet switches in a layer above the TOR switches. The cross-point switch is used to interconnect the TOR switches and the TOR switches include multiple ports with the same endpoints combined into so-called Port Aggregation Groups (PAGs). A TOR switch places traffic with the same destination into the ports in a predefined order, filling up ports within a PAG in a gradual fashion to keep port queues at some level of moderate occupancy. Thus, the ports in a PAG are filled one by one with the objective to make sure if some PAGs are not fully utilized, there is at least one or more ports that are completely traffic free and these ports are available to a pool of free resources. The free ports are detected by the cross-point switch and made available to use in the case of congestion. The cross-point switch is physically separate from the TOR switches, and there is a communication transport technique between them.

The cross-point switch can perform port fill and congestion detection, such as by monitoring interpacket gaps, i.e., idle frames, and establish new connections to alleviate the detected congestion.

The embodiments and operation are described with a reference to a data center network. However, it should be understood that the same principles can be applied to geographically distributed communication networks. The cross-point switches can extend the performance and functionality of any flat-topology data center architecture, including U.S. patent application Ser. No. 15/338,929, filed on Oct. 31, 2016, and entitled "STRUCTURED REARRANGED NETWORK FOR DATA CENTER AND HIGH-PERFORMANCE COMPUTING APPLICATIONS," the contents of which are incorporated by reference. Of note, the adaptive communication network described herein can be extended to any network architecture that aggregates multiple ports interconnecting the same endpoints. The adaptive communication network solves a key limitation described herein—insufficient packet switch Radix and commercial ASIC switch Radix growth rates. The adaptive communication network deals with the imbalance in bandwidth needs for various applications. As is shown herein, the adaptive communication network achieves a performance that has so far been considered unobtainable in the industry: use of a low-cost and low-power circuit switch to dynamically adapt network bandwidth to very rapid changes in demand loads without packet loss. Also, this is achieved without invoking centralized coordination between network edges where traffic is generated and a centralized cross-point switch that provides bandwidth adaptation capability, thereby producing extremely fast response times. This feature inherently enhances network automation, in general, another important aspect, goal and trend of modern network design.

The cross-point switches can adaptively rearrange bandwidth without packet loss despite lacking any buffering which is a key aspect—simple buffer-less operation in the centralized cross-point switches, preserving zero packet loss. Note, buffering occurs only at the edges, in the TOR switches. A key aspect is that flat-topology network architectures typically allow aggregation of multiple low-rate ports into a Port Aggregation Group (PAG) that has the same endpoints. This is unlike Clos or Fat Tree architectures that benefit from many low-rate links spread out to different destinations to provide large East-West network scalability. The adaptive communication network uses a logical group aggregation property to reallocate bandwidth across the network to meet rapidly changing demands, but without changing topology. The fixed topology is critical, as it eliminates the need for forwarding table re-computation, and accelerates network adaptation.

The cross-point switches are inherently low power and provide significantly higher Radix capability than packet processing switches. Power that would normally be spent on packet processing can be reallocated to increasing switch port count. The cross-point switches do not need Serializer/Deserializers (SERDES) as packet bit inspection is not needed. Thus, a lower power full-rate Clock and Data Recovery (CDR) can be used at a physical interface, and switching is done at the full CDR rate. This further allows to reduce overall power and potentially increase switch port count. An example architecture of the cross-point switch is described in U.S. patent application Ser. No. 14/924,802, filed Oct. 28, 2015, and entitled "HIGH PORT COUNT SWITCHING MODULE, APPARATUS, AND METHOD," the contents of which are incorporated by reference.

Advantageously, the approach described herein does not require a centralized controller that would need full visibility across the network. Bandwidth congestion problems are solved on a localized basis, providing a very fast response, along with added automation. Also, this approach could be applied to any network. Idle links can also transition to a low-power mode, for example, using IEEE 802.3az Energy Efficient Ethernet protocol. Further, in principle, an optical circuit switch could be used instead of an electrical switch for the cross-point switch but would need to monitor channel occupancy in some way, and provide fast switching speeds.

Adaptive Communication Network

To understand the operating principle of the adaptive communication network, consider a baseline flat-topology type network with TOR switches only. It can include TOR switches which are directly connected to a small number of neighbors in a pseudo-random manner such as using fiber-optic patch panels. Simulations using a variety of network traffic patterns have shown that this type of network preserves high performance even when the number of direct near-neighbor TOR connections is limited, i.e., approximately 8 to 16 near neighbors are sufficient for networks with 5000 TOR switches. However, each connection link should have sufficient bandwidth to support a large number of servers, with as many as 16 to 32 servers per TOR. Thus, each TOR switch only has about 8 to 16 distinct neighbors, but each link is composed of multiple channels providing connections between ports, e.g., 6×25 Gbps.

The following definitions are used herein with reference to the adaptive communication network:

Port (N) is the lowest granularity entity to which individual packets or flows can be directed, with individual queues. Each port is associated with a PAG.

PAG (P)—Port Aggregation Group includes ports with same packet switch endpoints, connecting near neighbors over a single link. The PAG is a collection of TOR switch ports that have the same destination, i.e., go to the same near neighbor TOR switch. The PAG is associated with a forwarding table entry. Each port inside a PAG must have its own queue and be separable, but physical connections can be made between TOR switch and cross-point switch using any approach. For example, the ports can be 25G, but the physical connection can be made using the 400ZR optical plug. The requirement is that cross-point switch is able to separate out 25G tributaries and treat them as separate switchable entities.

Channel—physical entity that the circuit switch operates on.

Link—network connection between adjacent neighboring TOR switches.

Cross-Point switch—circuit switch operating at channel granularity (and correspondingly at the TOR switch port granularity). The cross-point switch is a space switch that sets up direct connections between input and output. In examples described herein, this can be at a 25G level, fully non-blocking.

Figure 3:
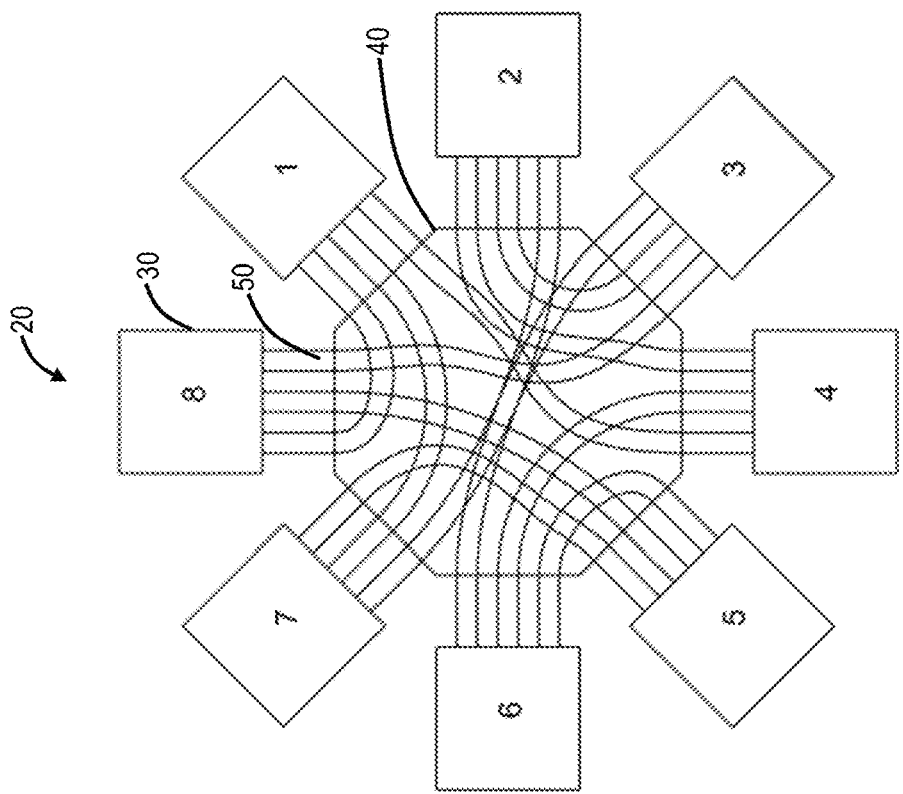
FIG. 3 is a network diagram of the small-scale communication network of FIG. 2 with a flat-topology network architecture and with Port Aggregation Groups (PAGs)
Figure 2:
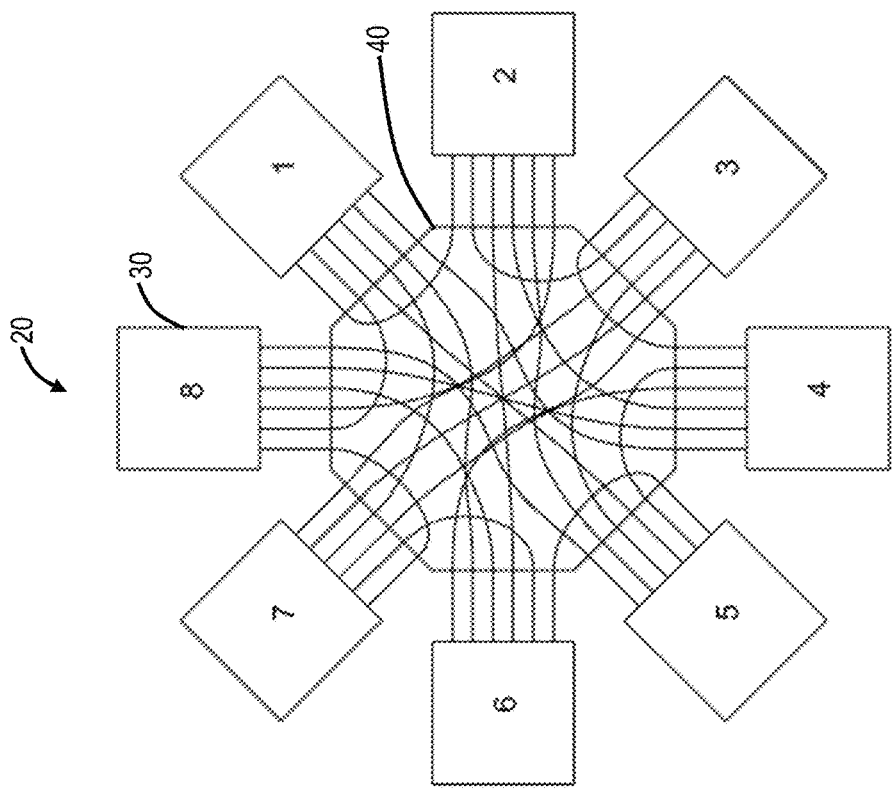
FIG. 2 is a network diagram of a small-scale communication network with a flat-topology network architecture and without Port Aggregation Groups (PAGs)

FIGS. 2 and 3 are network diagrams of an example, small-scale communication network 20 which is a flat-topology network architecture and without PAG (FIG. 2) and with PAG (FIG. 3). Of note, the adaptive communication network 20 is an example of an adaptive data center with just eight TOR switches 30 and a single cross-point switch 40. This size is small for illustration purposes; those skilled in the art will appreciate practical adaptive communication network contemplate hundreds to thousands of nodes, but the operation is the same albeit at a much larger scale. In this example, there are eight TOR switches 30 with six ports each and each of the six ports is connected to the cross-point switch 40. In FIG. 2, the communication network 20 has random connectivity in single port increments, i.e., no PAG. In FIG. 3, the communication network 20 also has random connectivity, but in two port increments, i.e., a PAG 50 of two ports. Further, the communication network 20 is described as a flat-topology network architecture in that there is only one layer of packet switching which is at the edges in the TOR switches 30 and an intermediate layer with the cross-point switch 40 to interconnect the TOR switches 30.

Both of the communication networks 20 in FIGS. 2 and 3 have the identical maximum latency of just 2 hops. In FIG. 2, all 6 ports are used to establish individual links between TOR switches 30 via channels. Equally and the even more potent network in FIG. 3, utilizes ports paired in the PAGs 50 to establish links between TOR switches 30, two channels per link. This results in a much simpler network topology with just half of the number of links as compared to the communication network 20 in FIG. 2, which simplifies routing tables and enables the proposed additional bandwidth reallocation functionality.

The central polygonal domain represents the cross-point switch 40 responsible for all the necessary functions associated with the implementation of the adaptive communication network architecture by establishing the network connections between the TOR switches 30 and specifying port aggregation. The physical connection mechanism between the TOR switches 30 and the cross-point switch 40 can be any communication transport technology, e.g., microwave, fiber-optic, free space optic, etc. Importantly, the cross-point switch 40 is demultiplexing link content into individual channel components for following switching. The cross-point switch 40 granularity is at a channel level and is preferentially the same as port granularity, although it may be a higher multiple of ports. Note, in an embodiment, the cross-point switch 40 is a single entity. In another embodiment, the cross-point switch 40 can be realized by multiple separate entities which require communication between them to exchange information.

A port's association with the PAG 50 depends on the central switch configuration and this association is pushed down into the edge packet switch (TOR switch 30) from the central circuit switch (cross-point switch 40).

Packets (or flows) at an ingress TOR switch 30 are directed to the PAG 50 associated with the appropriate destination. However, they are not distributed randomly to the ports. Rather, packets (or flows) are preferentially directed to the first port in the PAG 50 sequence where queue occupancy is below a preset threshold. In this way, occupied ports are forced to transmit near their full rate, and remaining ports are kept completely idle. In other words, the minimum number of ports in a PAG 50 are used to sustain the required bandwidth throughput. Of note, this is quite different from a Link Aggregation Group (LAG) which purposely combines multiple links into a single interface, and spreads traffic among the links for load balancing.

Figure 4:
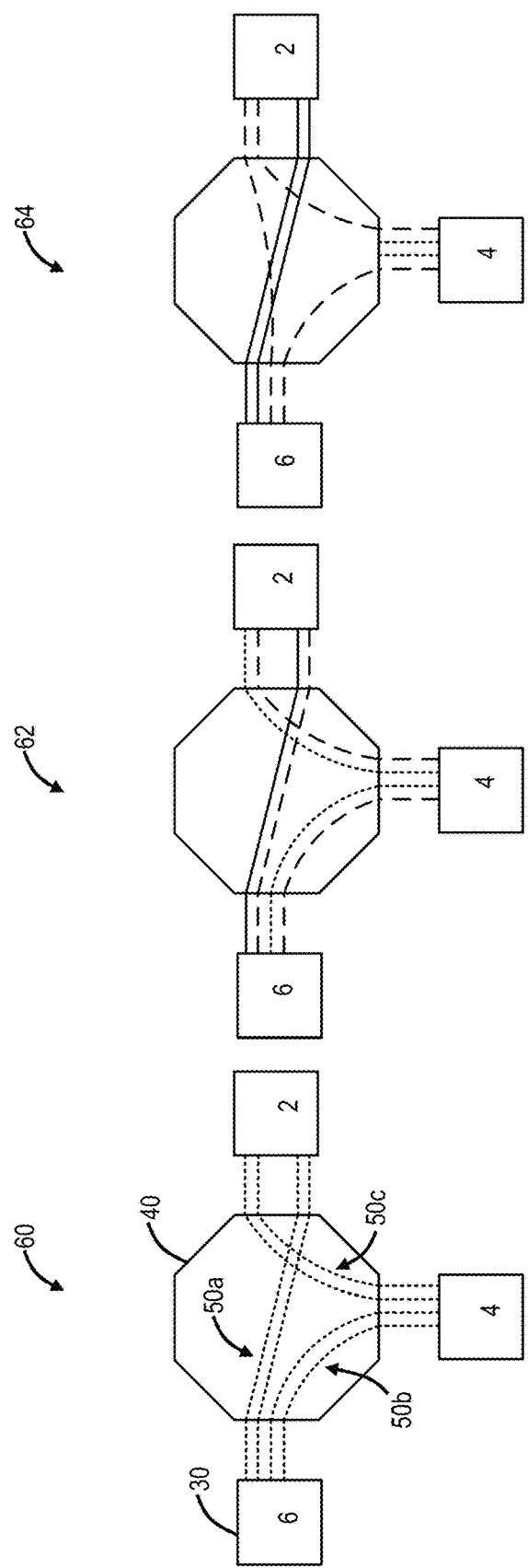
FIG. 4 is a portion of the communication network illustrating three Top of Rack (TOR) switches to describe operation of the PAG.

Note, the adaptive communication network 20 omits the servers 14 for illustration purposes in FIGS. 2, 3, and 4, but those of ordinary skill in the art understand that each of the eight switches 30 can include one or more servers 14 connected thereto. The adaptive communication network 20 architecture changes the approach such that all of the TOR switches 30 are actually Top of Rack switches (TORs) and have servers 14 attached. Unlike existing approaches, in the adaptive communication network 20, there are no switches 12 which serve a pure network interconnect function, i.e., there is no aggregation or spine layer in the adaptive communication network 20 architecture. Each TOR switch 30 has a number of ports which face towards other TOR switches 30 in the network 20. The interconnection between TOR switches 30 can be established in a uniform random, but non-repeating manner (i.e., each TOR switch 30 is connected to one other TOR switch 12). Again, note each TOR switch 30 will have additional ports for server connections, but these are not shown in FIGS. 2, 3 and 4.

Real data center networks may have hundreds, or even many thousands of such TOR switches 30. It may not be intuitively obvious, but the adaptive communication network 20 architecture is known to be much more efficient in operating with less hardware, providing higher throughput, and achieve lower latency than structured network architectures, such as Clos, Dragonfly, B-cube, etc. This is described in Sangeetha Abdu Jyothi et al., "Measuring and Understanding Throughput of Network Topologies," Feb. 11, 2014, and available at arxiv.org/abs/1402.2531v3; Ankit Singla et al., "Jellyfish: Networking Data Centers Randomly," Oct. 8, 2011, and available at arxiv.org/abs/1110.1687; and Henry Casanova et al., "Layout-conscious Random Topologies for HPC Off-chip Interconnects," 2013 IEEE 19th International Symposium on High Performance Computer Architecture (HPCA2013), the contents of each of the foregoing are incorporated by reference herein.

For example, if the TOR switches 30 have 16 network-facing PAGs, then each TOR switch 30 can reach 16 neighbors in one hop, a maximum of 240 TOR switches 30 in two hops, a maximum of 3600 TOR switches 30 in three hops, a maximum of 54000 TOR switches 30 in four hops, etc. In contrast, the Clos network 10 topology requires at least two hops for two layers, and four hops for three-layers.

The advantages of single-layer architectures are enumerated as follows. The adaptive communication network 20 architecture can use commercial, off-the-shelf components, such as switch ASICs, pluggable optical modules, etc.—no custom electronic hardware developments are needed. The adaptive communication network 20 architecture is a completely delayered, flat-topology network. The adaptive communication network 20 architecture has higher throughput and much fewer hops (five or lower) with high diverse path count (simulation details are presented in U.S. patent application Ser. No. 15/338,929 which was previously incorporated), relative to the structured network architectures. Also, the adaptive communication network 20 architecture can achieve fewer optical links and switches, i.e., reduced hardware at fixed throughput (simulation details are presented herein), relative to the structured network architectures.

The adaptive communication network 20 architecture exhibits, in deployment and rollout, a smooth, continuous trade-off between hardware cost and throughput (no large discrete increments in hardware or cost). The adaptive communication network 20 architecture is easily scalable, i.e., new server and switch insertion are simple, even with different port counts and technologies. As well, the adaptive communication network 20 architecture requires payment and deployment of only the servers 14 in use, i.e., no underutilized centralized fabric. The adaptive communication network 20 architecture ports can be aggregated into a few large PAGs, improving optical transceiver cost and front-panel density, e.g., typically 16 distinct PAGs is sufficient. In contrast, Clos scalability requires very large port fan-out to realize large network East-West scalability (horizontal). The adaptive communication network 20 architecture substantially increases resilience to failure through richer interconnects and through workload spread across the full data center, relative to the structured network architectures. Finally, the adaptive communication network 20 architecture is a fully packetized approach.

PAG Operation

FIG. 4 is a portion of the communication network 20 from FIG. 3 illustrating three TOR switches 30 2, 4, 6 to describe the operation of the PAG 50. FIG. 4 includes three stages 60, 62, 64 showing different steps. In this example, there are three PAGs 50*a*, 50*b*, 50*c*, namely a PAG 50*a* between the TOR switches 6, 2, a PAG 50*b* between the TOR switches 6, 4, and a PAG 50*c* between the TOR switches 4, 2, and each PAG is illustrated with two ports for example. This network fragment is trivial but serves to illustrate the operating principles. Of course, the real network will contain hundreds or thousands of TOR switches 30.

At stage 60, each of the PAGs 50*a*, 50*b*, 50*c* is shown with dotted lines to denote empty channels providing equal bandwidth interconnects between the TOR switches. At stage 62, dashed lines show partial channel occupancy in each of the PAGs 50*a*, 50*b*, 50*c*, indicating potential congestion on some interconnects, and a solid line on the PAG 50*a* indicating a fully occupied channel. At stage 64, the empty channels (dotted lines) in the PAGs 50*b*, 50C are reallocated to increase bandwidth on the congested interconnects.

As the traffic increases, channels in the PAG 50 are filled in one by one. That is instead of directing traffic to least filled ports which would randomly spread traffic across them, the TOR switch 30 preferentially fills traffic into ports in sequence nearby leaving other ports completely empty. Channels corresponding to ports are shown as completely filled channels with solid lines, partially filled with dashed, while empty ones with dotted, in FIG. 4.

The PAG 50 can use some of the concepts from LAG and Flexible Ethernet (FlexE). But these lack two aspects critical to the implementation of the PAG 50, namely payload traffic cannot be directed to specific ports and is spread across all available ports in a LAG, and hitless bandwidth resizing is not provided as an option in FlexE. The adaptive communication network 20 requires both of these capabilities and is thus described with the PAG 50 to differentiate from the industry term, LAG.

Cross-point Switch Monitoring

Again, the approach described herein does not require a centralized controller that would need full visibility across the network and is generally complicated to implement. In lieu of using the centralized controller, the cross-point switch 40 and the TOR switches 30 implement PAG port filling. Note, all channels between the TOR switches 30 traverse the cross-point switch 40 which can be an electrical-based switch. In an embodiment, lightweight payload monitoring is used by the cross-point switch 40 to detect which channels carry traffic (i.e., the solid and dashed lines in FIG. 4) and which ones are still empty (i.e., the dotted lines in FIG. 4).

In a preferred embodiment, the data interfaces in the cross-point switch 40 are equipped with only Clock and Data Recovery (CDR) at the channel rate, e.g., operating at 25 Gbps. Thus, the cross-point switch 40 avoids SERDES down to lower speeds which significantly reduces power and circuit complexity in the cross-point switch 40. However, this simplification requires addressing two critical aspects, namely Forward Error Correction (FEC) and cross-point switch 40 monitoring of channel fill.

First, Forward Error Correction encoding/decoding would have to be associated with the individual port, rather than at a PAG level. In this case, the cross-point switch 40 simply does transparent pass-through of the FEC encoded signal. While it may appear that this doubles communication link length, in reality, noise is completely removed at CDR circuits in the cross-point switch 40. Therefore, the worst-case impact is a doubling of bit error rate (BER). Assuming a commonly used Non-Return to Zero (NRZ) signal modulation, BER is $$BER \sim \frac{1}{2}\mathrm{erfc}(\sqrt{SNR_b}).$$

A 2× difference in BER corresponds to a penalty of ~0.5 dB in bit Signal-to-Noise Ratio ($SNR_b$).

Second, the cross-point switch 40 needs to detect which channels are carrying traffic and which ones are completely empty. That is, the TOR switches 30 are configured to load ports in the PAG 50 locally, using the approach of sending traffic to the lowest port that is not filled above a threshold and then to a next unoccupied port. Of note, other approaches are possible; the key is to fill up ports one by one as opposed to load balancing across all of the ports in the PAG 50. For the cross-point switch 40 to detect channel occupancy, in some cases, this capability can be provided simply by selective shut down of empty channels by the TOR switch 30. In cases where physical interfaces are not capable of such functions, a predetermined sequence of bits can be used as a payload. For example, long sequences of '1' and '0' can be transmitted and detected with a low-pass Radio Frequency (RF) detector. Note, the CDR in the cross-point switch 40 may have a problem locking onto such signals, but it is not an issue as there is no actual payload and the only need is to detect a presence of such signals. This signal can be referred to as an IDLE signal and works on a principle similar to an Alarm Indication Signal which is easily implemented in simple digital hardware.

In another embodiment, the TOR switches 30 can report transmit queue levels to the cross-point switch 40 periodically to provide insight into inactive links/ports or low activity ports. This could also be utilized if the cross-point switch 40 is implemented as an optical switch which does not have visibility to the data. In other embodiments, the cross-point switch 40 can include SERDES and/or FEC functionality, albeit adding additional circuitry and power in the cross-point switch 40. Here, the cross-point switch 40 could include detailed payload inspection, e.g., empty channels could be marked by transmitting predetermined IDLE Ethernet frames.

PAG Operation Process

Figure 5:
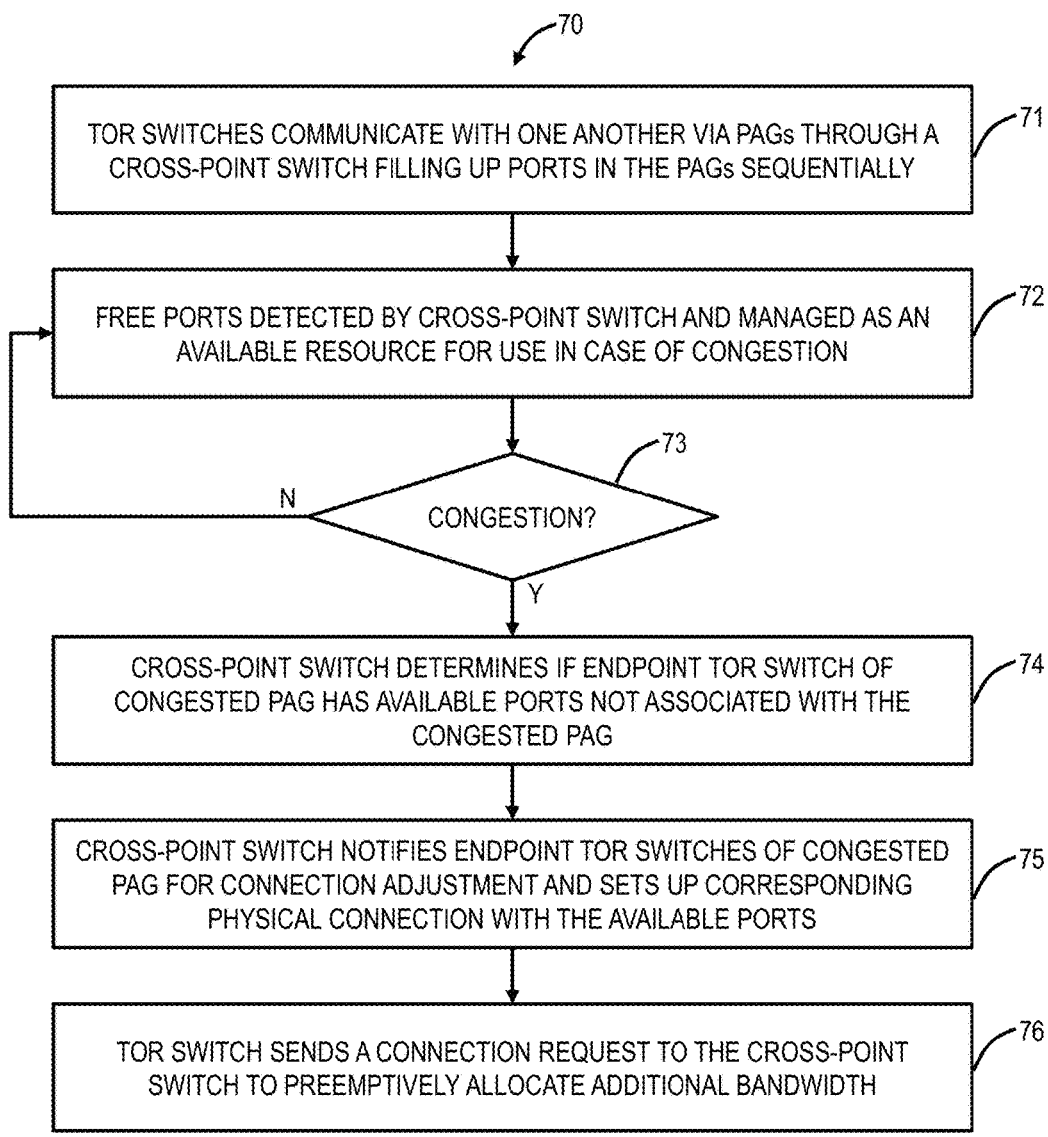
FIG. 5 is a flowchart of a PAG operation process.

FIG. 5 is a flowchart of a PAG operation process 70. The TOR switches 30 communicate to one another via the PAG 50 through the cross-point switch 40 by filling up the ports in the PAG 50 sequentially (step 71). Again, the intent with the PAG 50 is to use a first port up until a certain fill threshold and then moving to the second port until a certain fill threshold, etc. In this manner, the PAG 50 has as many free ports as possible. The free ports are detected by the cross-point switch 40 and managed as an available resource for use in case of congestion (step 72). Packet flows undergo frequent churn in the network, with old flows completing and new flows starting up. New flows will be preferentially allocated to the lower number ports, if queue space is available. Therefore, port traffic occupancy will naturally move towards lower number ports, keeping higher number ports as a free bandwidth resource pool.

Congestion (step 73) occurs where a TOR switch 30 is on the last port in the PAG 50, and this port and all of the other ports in the PAG 50 are at or near filled. The TOR switches 30 in a PAG 50 themselves know of the congestion, and the cross-point switch 40 must also detect the congestion. In an embodiment, the cross-point switch 40 can detect the congestion by monitoring each port. For example, the cross-point switch 40 can monitor interpacket gaps (i.e., IDLE frames) and if the IDLE frames on a PAG connection are below some threshold, there is congestion on the PAG 50. In another embodiment, the cross-point switch 40 can determine congestion based on the transmit queue levels which are reported thereto by the TOR switches 30.

If congestion in the PAG 50 is detected (step 73), the cross-point switch 40 checks its internal data obtained in step 72 to determine if the endpoint TOR switch 30 of the congested PAG has available ports not associated with the congested PAG 50 (step 74). If there are available ports, the cross-point switch 40 notifies the endpoint TOR switches of the congested PAG for a connection adjustment and sets up the corresponding physical connection with the available ports (step 75). Here, the process 70 enables congestion relief by adding ports to the PAG 50 if there are available resources. Adding the additional port to the PAG 50 results in removing this port from another PAG 50. Note, the TOR switches 30 can use a variety of protocols to adjust this bandwidth, and the cross-point switch 40 sets up the physical connection. Alternatively, the TOR switch 30 can send a connection request to the cross-point switch 40 to preemptively allocate additional bandwidth (step 76). For example, the additional bandwidth can be allocated along the full path expected to be taken, i.e., allocating bandwidth for all the hops. Optionally, the additional bandwidth can be allocated on a short-cut method, i.e., direct source to destination TOR switch connection by a single hop, which in this case changes topology. But this change may not need to be advertised to the full network, since it is a short-duration connection for a very specific use, and not for general use.

Local Link Congestion or Failure

The following use case is described in terms of dealing with congestion, but the same can be used in case of failures. As the number of occupied channels between a pair of TOR switches 30 approaches all available, this condition can trigger a centralized switch reconfiguration. For example, in FIG. 4, the cross-point switch 40 sees that traffic between TOR switches 2, 6 start to get congested (there is no empty channels left), as at stage 62. At the same time, there is still unused ports left on both TOR switches 2, 6, which are currently leading to TOR switch 4. The cross-point switch 40 reconfigures its internal connectivity to establish a direct connection using these previously empty ports, shown as dotted in stage 64. (Note: they still reach to the cross-point switch, but are not connected to anything within it). Once established, the cross-point switch 40 pushes the new port assignment to TOR switch 2, 6 that binds these ports to the PAG 50*a*, so the link connecting TOR switches 2, 6 is boosted to 3 channels, while links connecting TOR switch 4 to TOR switches 2, 6, respectively, are reduced to 1. Importantly, it should be noted that the network topology does not change, and all forwarding tables stay the same. The only change is an association of a port to a different PAG.

As traffic grows in the network 20, new packet flows are preferentially directed to specific channels in the interconnect (dashed), while keeping others idle (dotted), in FIG. 4. Some interconnections start to get congested, as shown in stage 62 by a reduced number of idle dotted channels. However, other links may still have idle channels (dotted lines). The cross-point switch 40 monitors these conditions, detects congestion, and reallocates idle dotted channels towards congested links. This is done by gradually associating an increasing number of physical channels with a specific PAG 50. Note that since dotted channels do not carry any traffic, there is no packet loss in the network 20 due to this reconfiguration. As temporary congestion subsides, the original connection may be restored. At no time is the link carrying traffic interrupted, and no packets are dropped during reconfiguration. Further, while interconnect bandwidth is changed, physical topology stays constant, and routing tables are not affected.

Figure 6:
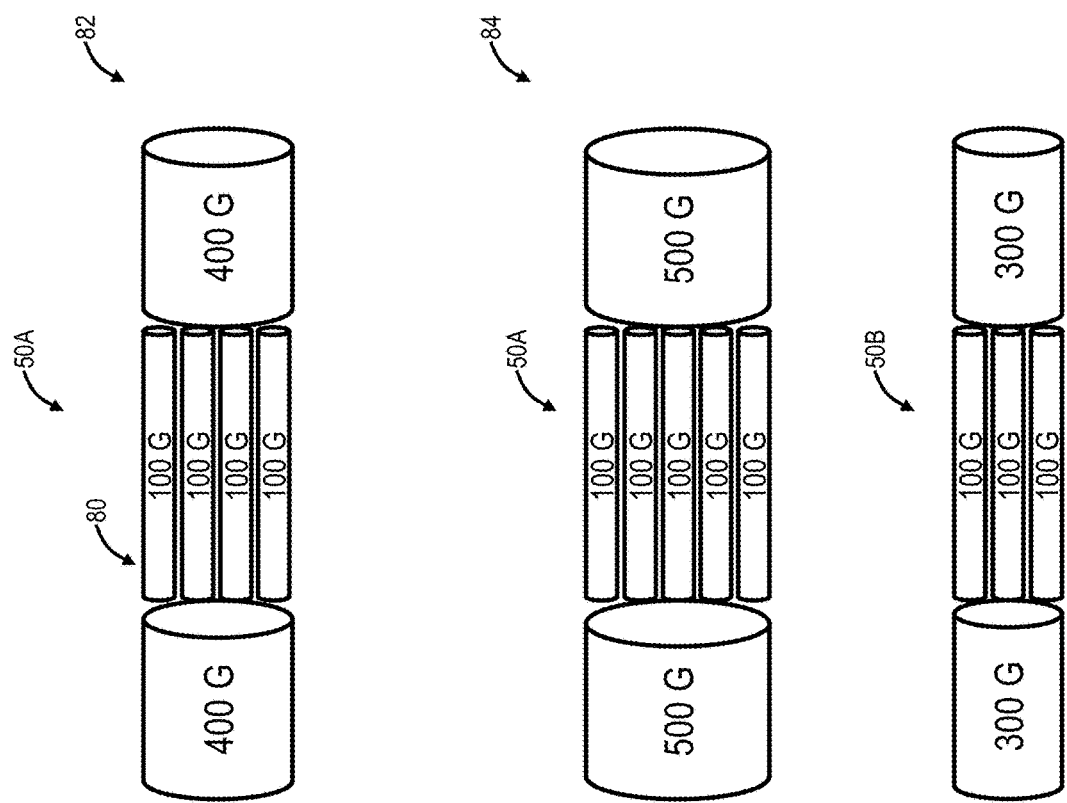
FIG. 6 is a logical diagram of various PAGs with different interconnect bandwidth with different numbers of physical channels (ports)

FIG. 6 is a logical diagram of a PAG 50 with different interconnect bandwidth with different numbers of physical channels (i.e., ports 80). Note, the number of ports 80 in FIG. 4 ranges from 1 to 3. Of course, a larger number of ports 80 in the PAG 50 are contemplated as illustrated in FIG. 6 from 3 to 5. The associations of physical ports 80 with PAGs 50 can be handled leveraging FlexEthernet type specification. For example, all network original connections may have been established as a 100G Media Access Control (MAC) feeding a single 100G physical channels. Original links between the TOR switch 30 may include 4 100G physical channels, as at stage 82. After reconfiguration, a congested PAG 50A is boosted to 500G at stage 84, while underloaded links are reduced to 300G, as shown in a PAG 50B.

As traffic on a particular PAG starts to decrease, the association of physical channels is adjusted, thereby again preferentially directing new packet flows onto specific channels and making others available to the bandwidth pool of resources. This effectively provides automated and dynamic bandwidth management, scaling up and scaling down without the need for central controller intervention. The adaptive nature of this scaling can provide automated management of, for example, 'elephant' flows that change with time, as well as provide network resiliency during peak network usage times.

High Hop Count Flows

An application layer may advertise, or the TOR switch 30 or cross-point switch 40 may detect that there is a large number of flows between two specific endpoints that require a large number of hops to reach the destination. As each extra hop in the flat-topology architecture adversely affects overall network throughput by consuming express links, it would be advantageous to set up either a direct connection shortcut, or at least a shortened connection between nodes.

Figure 7:
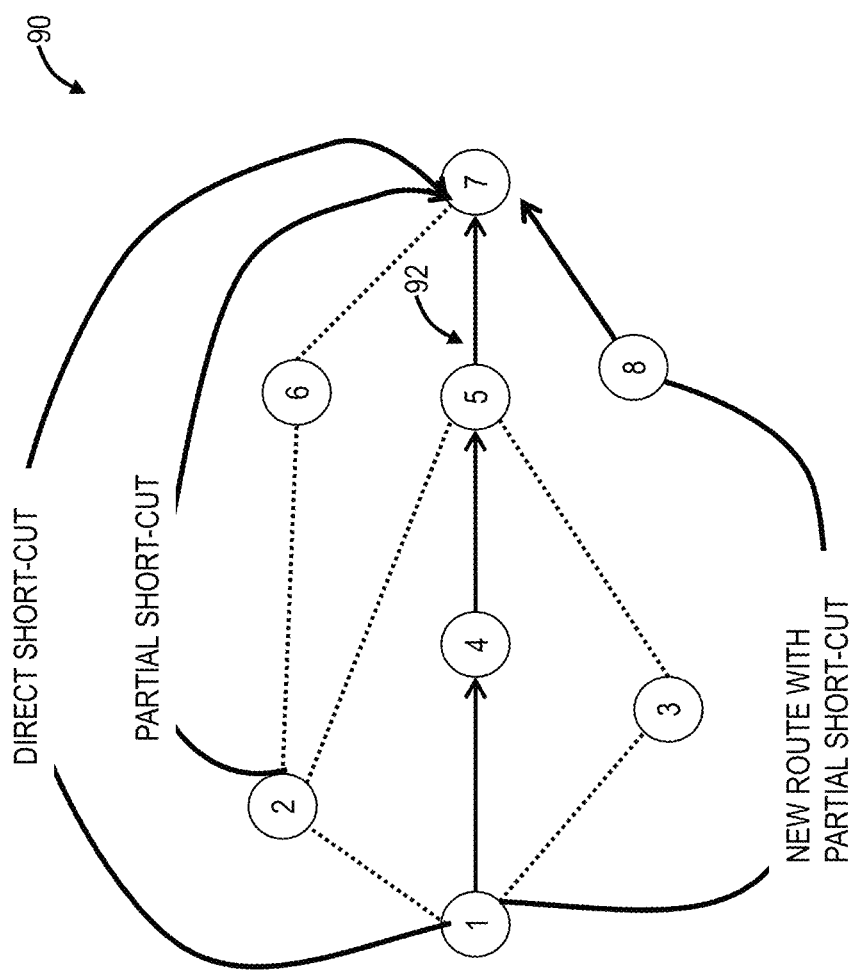
FIG. 7 is a diagram of a sample network section illustrating hop counts.

FIG. 7 is a diagram of a sample network section 90. For example, a connection 92 from TOR switch 1 to TOR switch 7 that takes 3 hops (traversing TOR switches 4 and 5). It also shows that some links are not occupied (dotted lines), and therefore those ports can be reallocated to provide a direct connection. Three options are illustrated. First, totally new route as direct short-cut may be established between the TOR switch 1 and the TOR switch 7, which is the best solution. Second, in cases where the TOR switch 1 may not have any available ports, short-cuts of intermediate hops may still be beneficial, as for example keeping the TOR switch 1 to TOR switch 2 links and adding a short-cut between TOR switch 2 and TOR switch 7. Third, a totally new route with a partial short-cut may be implemented.

Short-cuts may be kept private for the specific demand that initiated the configuration. This prevents the short-cut from forcing advertising new connectivity and re-computing forwarding tables. It also preserves full short-cut bandwidth for the originating demand.

Pre-schedule or Low-latency Sensitive Traffic

If the application knows of upcoming large volume demand, such as Virtual Machine (VM) migration or large data set to transfer, it may request increased bandwidth connection to be established through cross-point switch 40. This mode is well known in the industry. Similarly, latency-sensitive traffic may request a direct shorter hop connection between TOR switches 30.

The difference from conventional approaches is that the cross-point switch 40 may not be able to satisfy this request by a direct connection, but may still be able to improve performance by leveraging intermediate nodes with empty channels or ports. In this mode, it is possible that some connections can result in a change in network topology. Depending on the pre-set policies and expected duration of the topology change, it may be advertised to the rest of the communication network 20 with a corresponding update in forwarding tables. Alternatively, this change can be advertised only locally to the immediately impacted nodes, and not perturb the rest of the network.

Implementation Details

Figure 8:
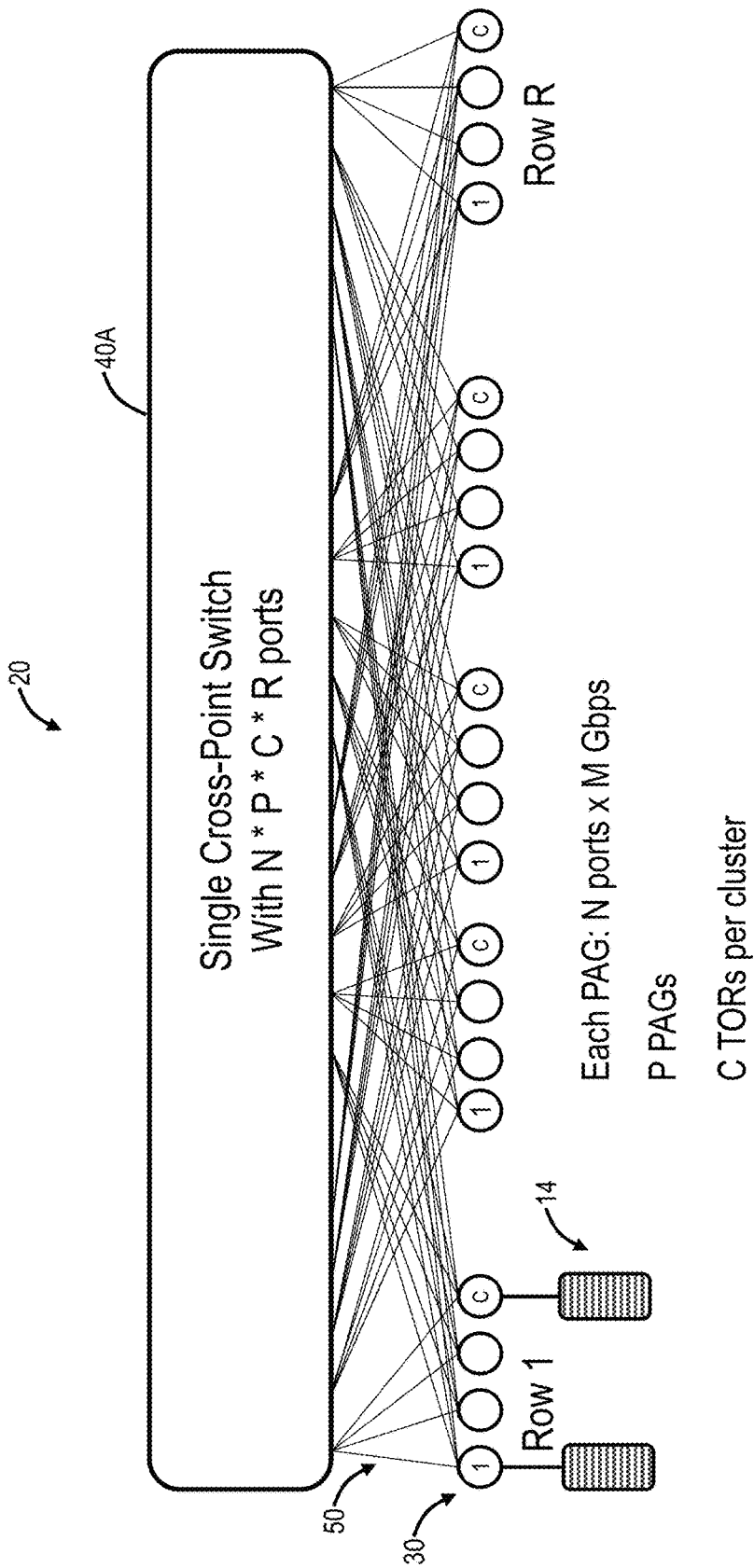
FIG. 8 is a block diagram of the adaptive communication network implemented with a single cross-point switch.
Figure 9:
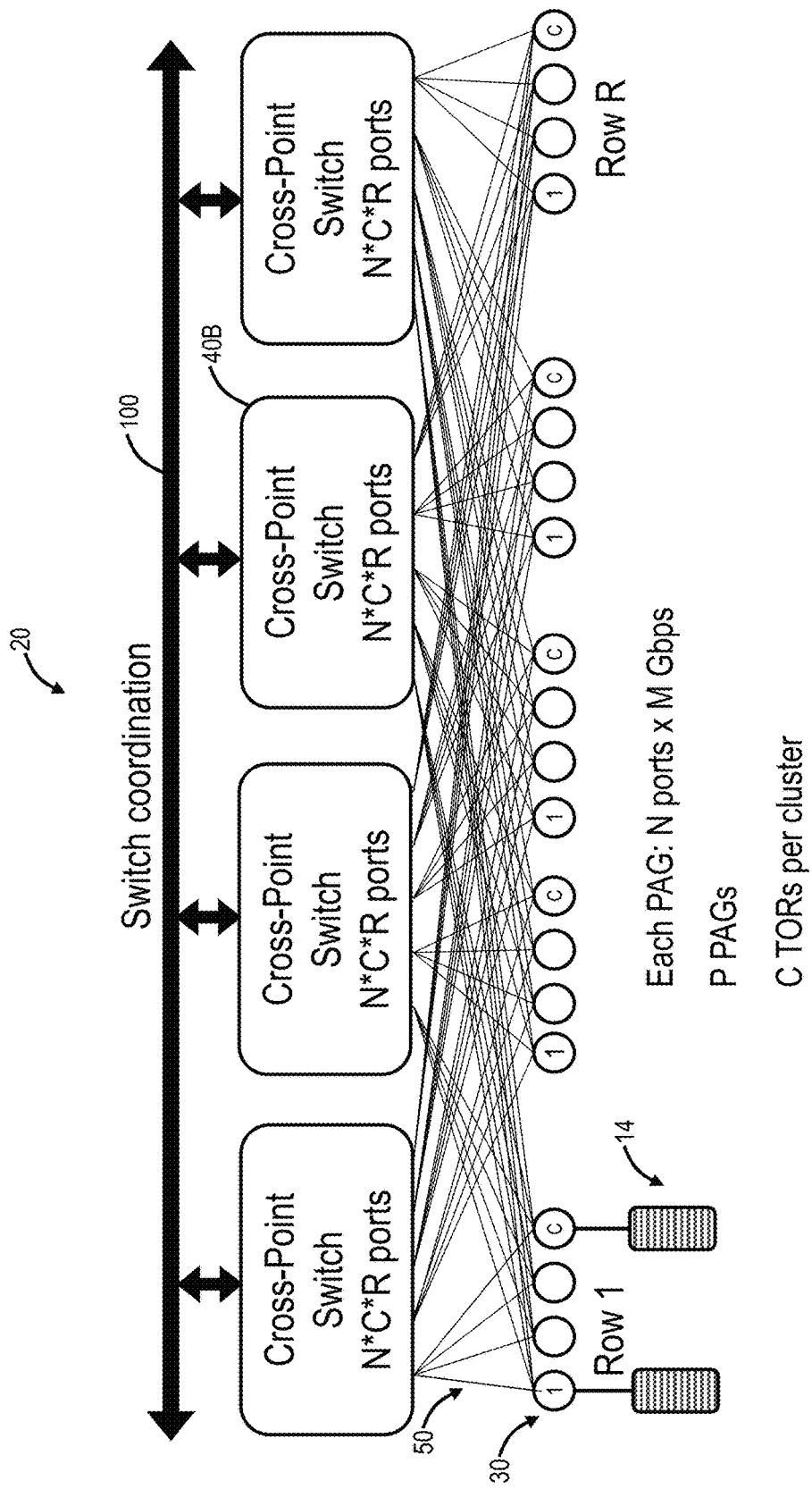
FIG. 9 is a block diagram of the adaptive communication network implemented with multiple cross-point switches.
Figure 10:
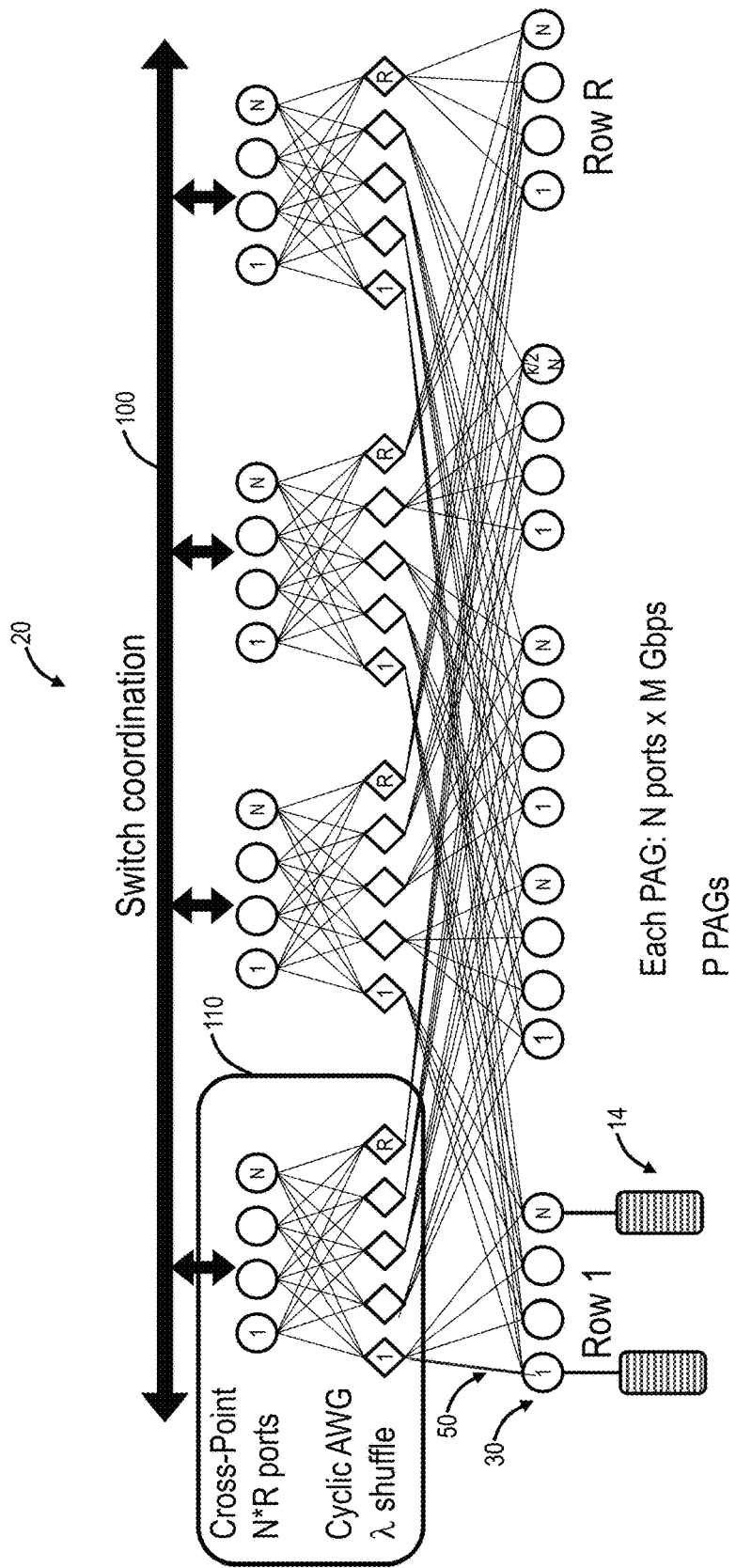
FIG. 10 is block diagram of the adaptive communication network implemented with multiple cross-point switches and a reshuffle.

The following configurations assume that each TOR switch 30 has network connections including P PAGs, with each PAG 50 including N physical ports, P and N are positive integers. A port may correspond to the granularity of the TOR switch 30, but does not necessarily have to. Given today's technology, assume the following number as an example: P=12 PAGs, with N=4 ports per PAG. In FIGS. 8-10, P is a number of PAGs, N is a number of ports in each PAG with each port at M Gbps, C*R represents a number of TOR switches supported (e.g., R rows, C column in a cluster), all of the values, P, N, C, and R are positive integers (M does not need to be an integer). XP can denote the number of ports in the cross-point switch 40, of course, XP is a positive integer.

There is a number of configurations possible, depending on the size of the communication network 20 and Radix of the available TOR switch 30. For example, if network demands match the switch Radix directly, a single switch 40A may be used, as shown in FIG. 8 which is a block diagram of the adaptive communication network 20 implemented with a single cross-point switch 40A. Given today's technology, with a single switch blade supporting 25 Tbps, the cross-point switch 40 can have XP=1024, e.g., 1024×25 Gbps capacity is a reasonable assumption. The number of TOR switches 30 supported is denoted as C*R=XP/(P*N), and with example values of XP=1024, P=12, and N=4, the communication network 20 can support up to 21 TOR switches 30, with the single cross-point switch 40A.

Clearly, many networks 20 will require support for more than 21 TOR switches 30. This can be accomplished by deploying multiple cross-point switches 40, without sacrificing overall architectural benefits, as shown in FIG. 9 which is a block diagram of the adaptive communication network 20 implemented with multiple cross-point switches 40B. Each cross-point switch 40B is responsible for a fraction of the total network bandwidth, and inter-switch coordination 100 is required to advertise link occupancy states. In this configuration, each port is connected to an individual switch 40B, requiring P total cross-point switches 40B. Correspondingly, the total number of networked TOR switches 30 is increased by the same factor P, as C*R=1024/N=256 TOR switches.

Of course, the ultimate limit for such a two-tier network would be to connect each of N channels to an individual switch 40B, producing a network capable of supporting 1024 TOR switches 30 using P*N=48 switches. For the example numbers, this would require 1024*48=49152 bidirectional links, which is impractical. Even if connected to the same multi-switch chassis, electrical signal fan-out to individual switch blades appears impractical.

Fortunately, a well-known optical wavelength shuffle can be used to solve this problem. If each one of N channels is assigned to a different wavelength, an N-cyclic arrayed waveguide grating (AWG) can be used to reshuffle wavelengths among incoming fibers, resulting in N times reduction in fiber count. FIG. 10 is a block diagram of the adaptive communication network 20 implemented with multiple cross-point switches 40B and a reshuffle 110. For example, this can support a total of 1024 TOR switches 30 interconnected.

In all configurations that require multiple cross-point switches 40B, notice these configurations are not fully non-blocking. The TOR switch ports are only able to communicate if they are connected to the same physical cross-point switch 40B and are similarly numbered. This is not a problem however due to the rule that all PAGs are filled with traffic starting at the lowest port number within the PAG 50. Therefore, ports that are connected to the same cross-point switch 40B are filled with traffic first across the network. This approach will maximize the number of remaining free ports that are matched by the cross-point switch 40B and are available for bandwidth expansion. Similarly, ports are released back into available bandwidth pool in an inverse sequence.

Traffic with long flow persistence much longer and low churn may cause fragmentation of bandwidth across ports and the cross-point switches 40B. Fortunately, typical traffic has very large amount of churn with many flows starting up and completing the network. In this case, traffic will continue to naturally migrate towards lower numbered ports, gradually releasing bandwidth on the higher numbered ones.

Although using electrical cross-point switches instead of passive optical patch panels will require double transceiver count, it is possible that a number of network ports could be reduced (relative to static patch panel approach) as connections will require fewer hops.

PAG Example

Figure 11:
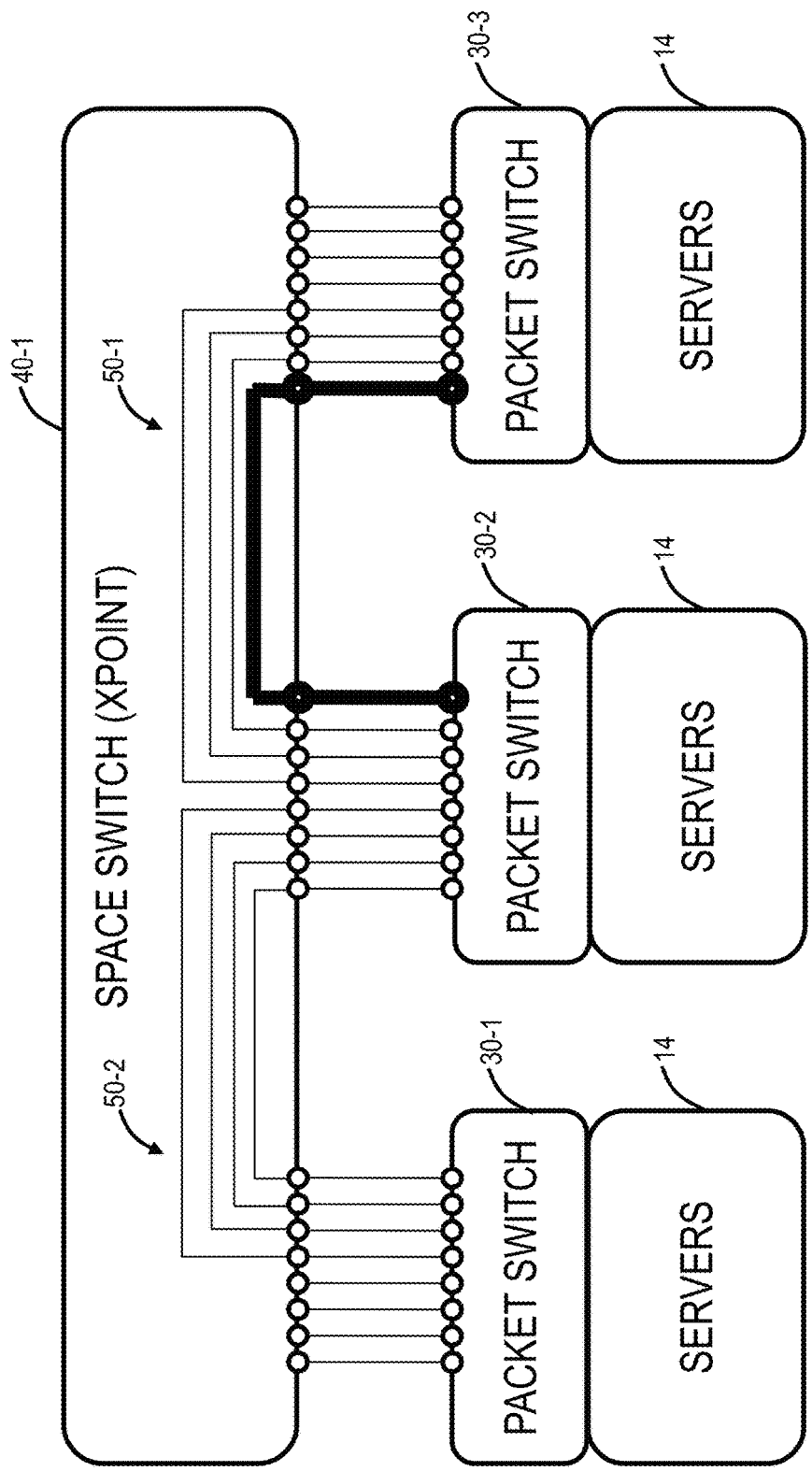
FIGS. 11-15 are diagrams of an example of PAG operation between a cross-point switch and three TOR switches each connected to corresponding servers.
Figure 12:
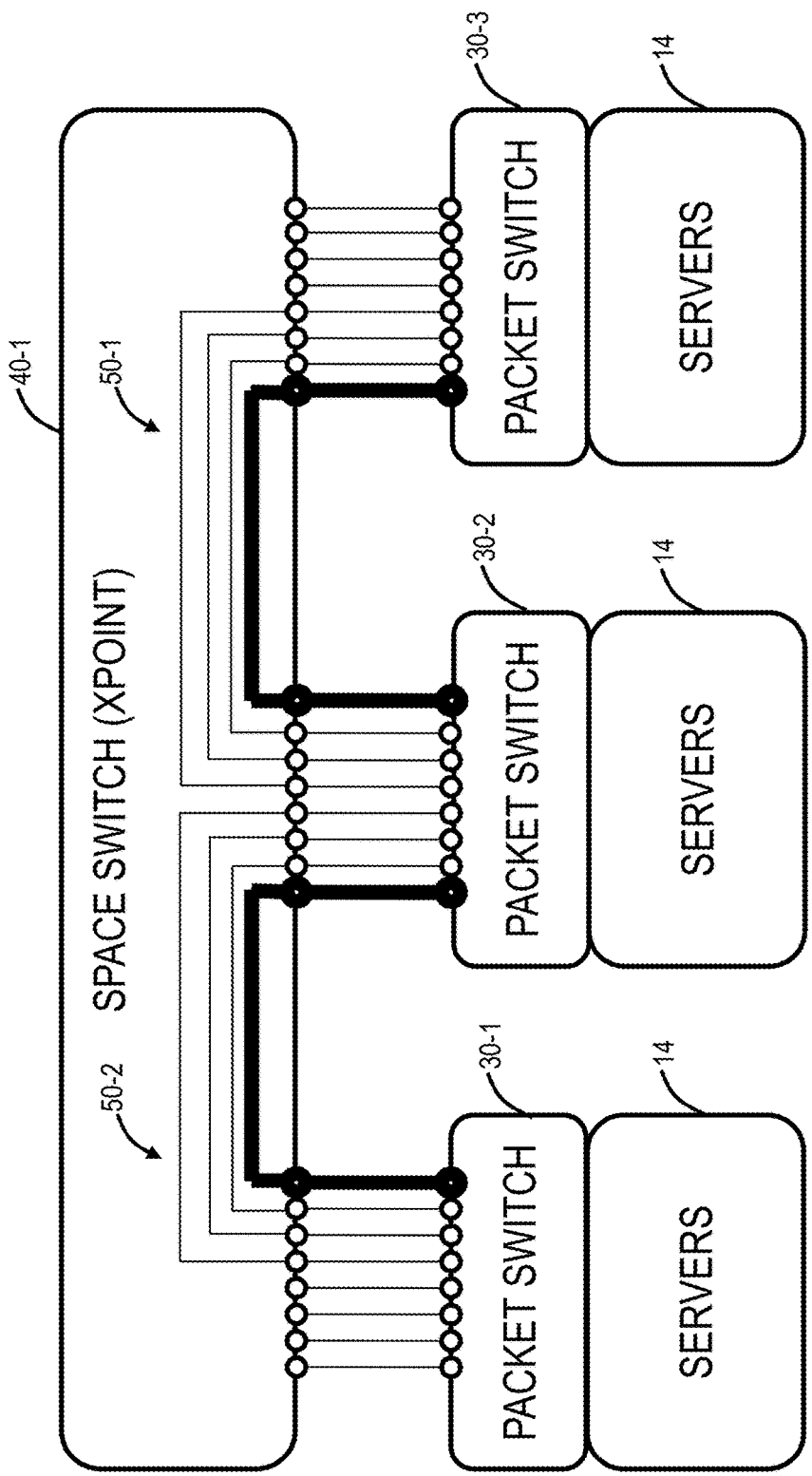
Figure 13:
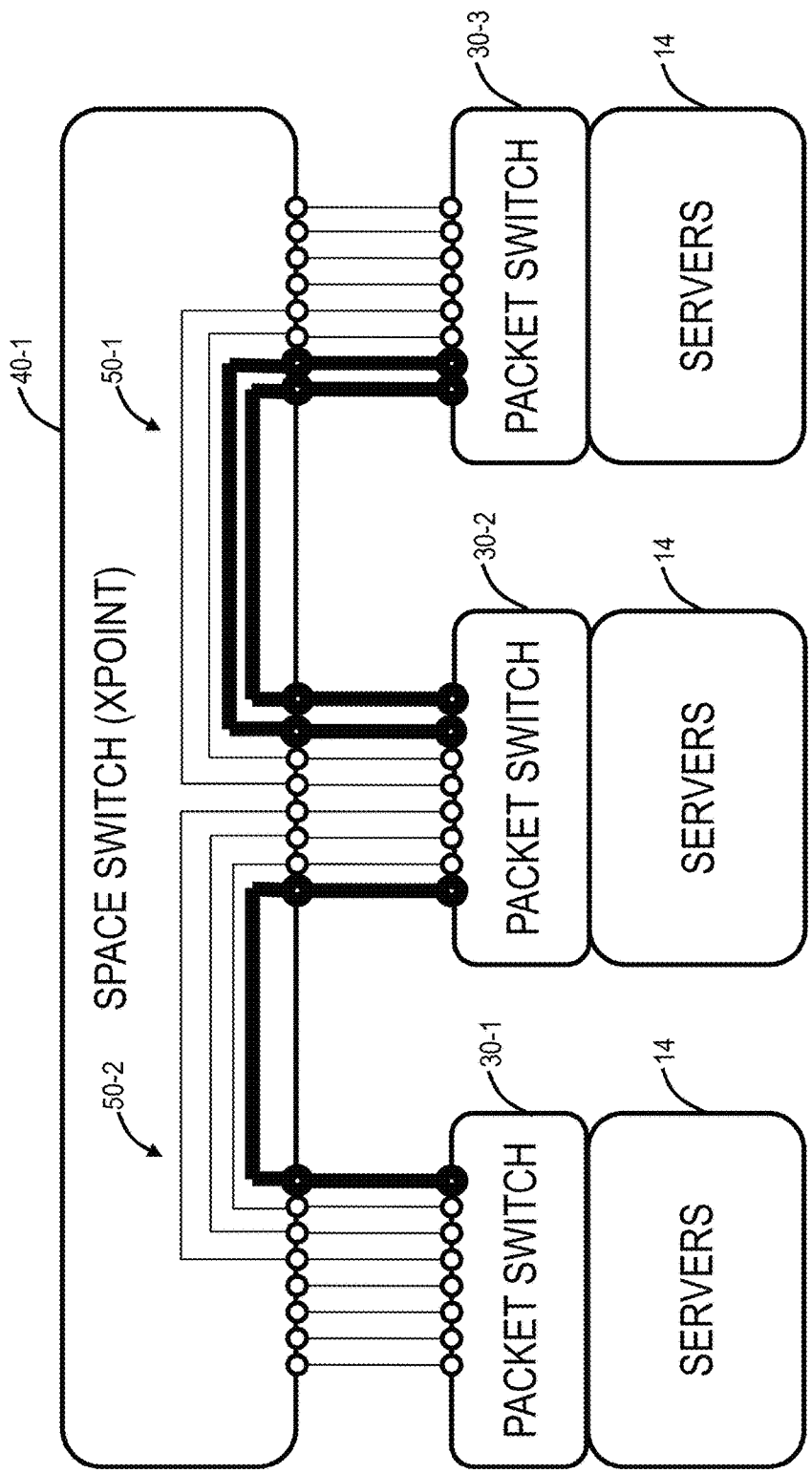
Figure 14:
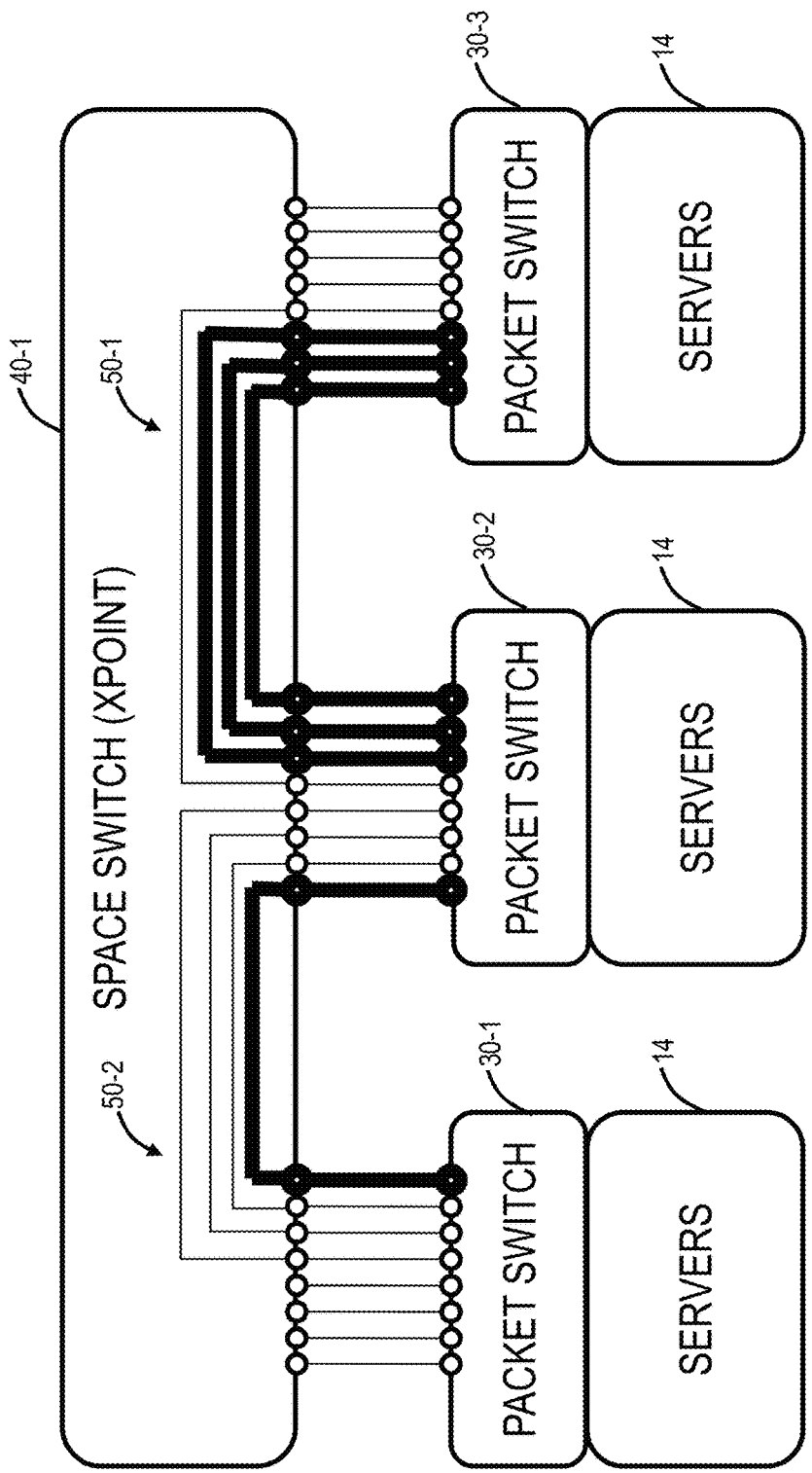
Figure 15:
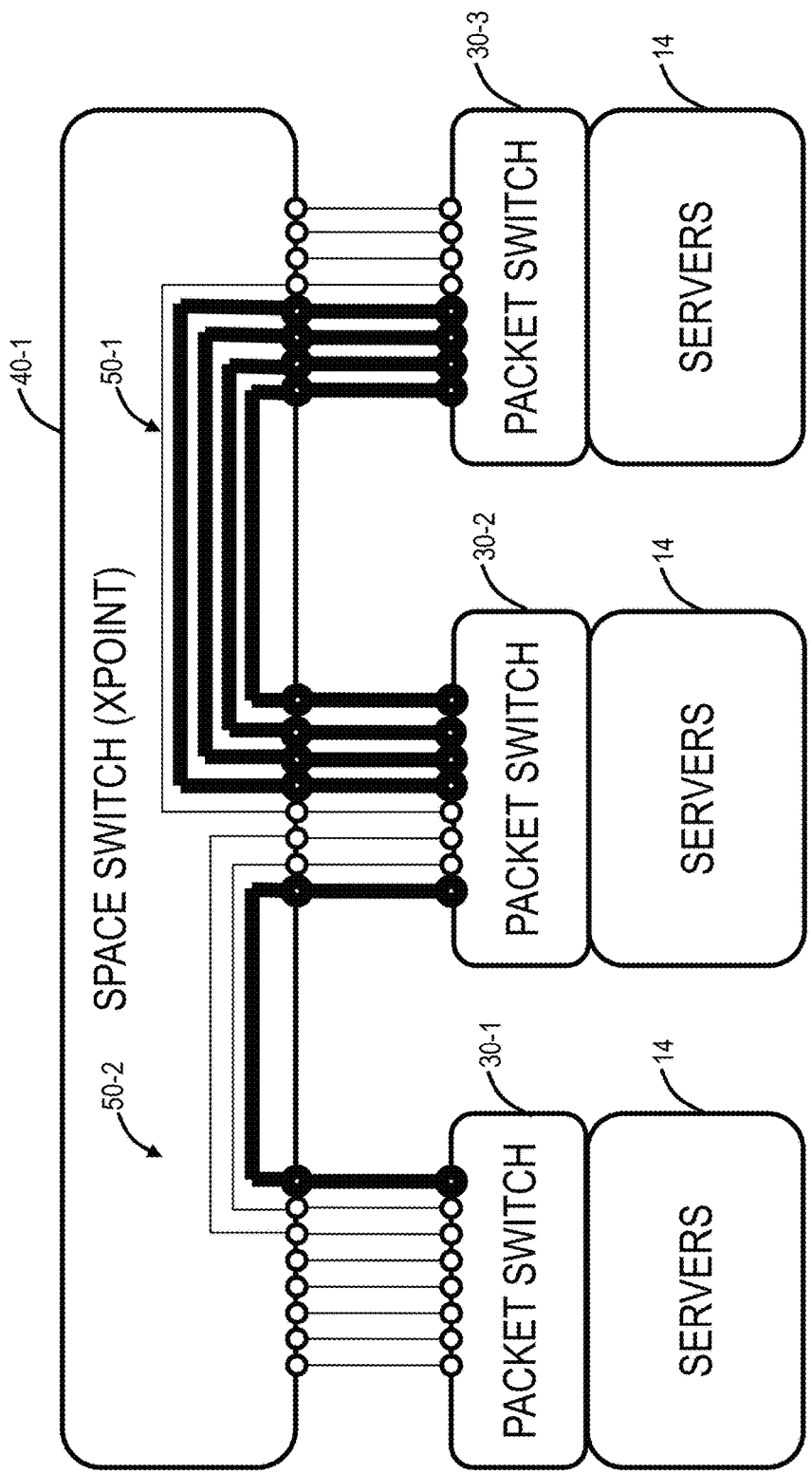

FIGS. 11-15 illustrate an example of PAG operation between a cross-point switch 40-1 and three TOR switches 30-1, 30-2, 30-3 each connected to corresponding servers 14. There are two example PAGs 50-1, 50-2 each with N=4 and between the TOR switches 30-1, 30-2 and between the TOR switches 30-2, 30-3. In FIG. 11, a first channel is filled on the PAG 50-1. In FIG. 12, a different channel is filled on the PAG 50-2. In FIG. 13, the first channel queue starts getting busy in the PAG 50-1 and a $2^{nd}$ channel is filled in the PAG 50-1. In FIG. 14, the $1^{st}$ and $2^{nd}$ queues are busy in the PAG 50-1, and a $3^{rd}$ channel is filled. In FIG. 15, the PAG 50-1 is near exhaustion—all 4 ports are close to full. The cross-point switch 40-1 finds a free port, such as in the PAG 50-2, and reallocates the port to the busy PAG 50-1. The cross-point switch 40-1 pushes the new port to the PAG 50-1 association to the affected TOR switches 30-1, 30-2, 30-3 (forwarding table stays the same).

Example Cross-point Switch

Figure 16:
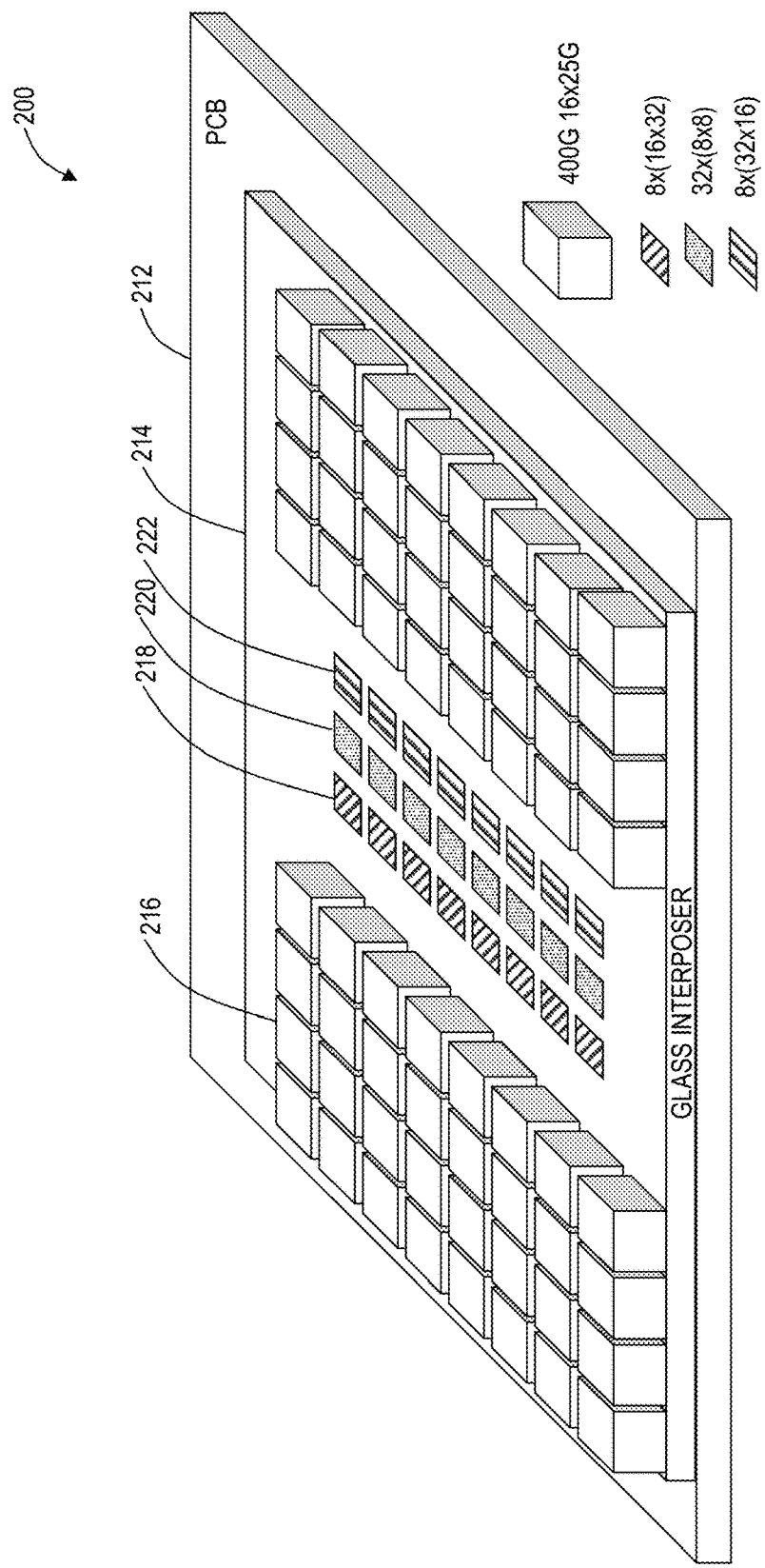
FIG. 16 is a perspective diagram of a high port count switching apparatus which can implement the cross-point switch.
Figure 17:
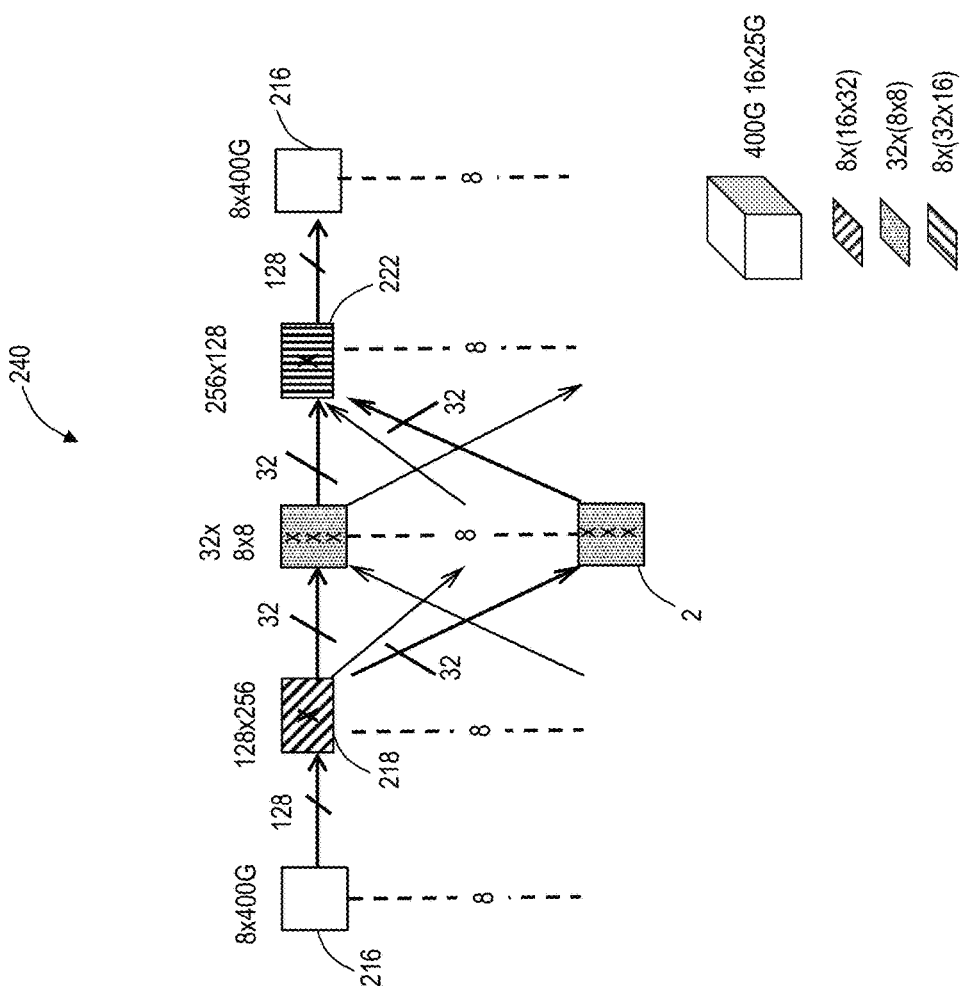
FIG. 17 is a block diagram of an interconnection structure for the high port count switching apparatus.

FIG. 16 is a perspective diagram of a high port count switching apparatus 200 which can implement the cross-point switch 40. The specific data rate, port count, and component count numbers described herein are for illustrative purposes only; those of ordinary skill in the art will recognize other values are also contemplated. The switching apparatus 200 includes a Printed Circuit Board (PCB) 212, a glass interposer 214, optical transceivers 216, and switching circuitry 218, 220, 222. In an exemplary embodiment, the switching circuitry 218, 220, 222 is formed from small CMOS switch cells, e.g., 8×8 or similar to build a CMOS die with 8×(16×32) and 32×(8×8) configurations. In this example, the switching circuitry 218 are each an 8×(16×32) switch cell, the switching circuitry 220 are each 32×(8×8) switch cells, and the switching circuitry 222 are each an 8×(32×16) switch cell. FIG. 17 is a block diagram of an interconnection structure 240 for the high port count switching apparatus 200.

The switching circuitry 218, 220, 222 collectively forms an electronic CMOS-based cross-point switch which consumes much less power than comparable existing switches, i.e., packet fabrics. The electronic switch minimizes power consumption in the switch core by providing very simple cross-point functionality performed at a full signal rate, i.e., 28 Gbps or 56 Gbps, etc. Further, this electronic switch operates on single-ended signals, providing an ability to construct a larger switch matrix by providing large I/O port count. I/O port drivers and clock-and-data recovery are very low power, as the interposer level RF interconnects have a very low loss at high frequencies.

Advantageously, the switching circuitry 218, 220, 222 forms a low power electrical switch, with purely cross-point type functionality (no fast Time Division Multiplex (TDM) or Packet functionality). Cross-point switching is performed at high rate granularity, i.e., 25 Gbps for example. An interposer is a substrate, providing routing (electrical, optical, or otherwise) between one component, (i.e., die, IC or socketed device or module) and another. In various exemplary embodiments, the apparatus 200 can utilize the glass interposer 214 instead of silicon, ceramic, and/or organic interposer. The glass interposer 214 is used to interconnect the switching circuitry 218, 220, 222 to one another and the optical transceivers 216 to the switching circuitry 218, 220, 222.

The glass interposer 214 has a relatively low thermal conductivity, thereby thermally isolating individual elements. High-quality heat sinking can be provided from the fill (not shown for clarity), and/or by using Cu Through Glass Vias under the devices to the bottom heat sink (not shown for clarity). In the example of FIG. 16, the end result is a single module providing 25.6 Tbps of switching capacity excluding overhead (1024×1024 ports at 28 Gbps), and with ~20×20 cm dimension and <600 W power consumption.

The glass interposer 214 is a key enabler of the high density interconnection in the apparatus 200, and the glass interposer 214 has the following advantages, for example, a) superior mechanical stability allowing low dimension, dense electrical interconnect, b) very low dielectric loss allowing wideband data transmission, i.e., 25 and 56 Gbps, c) very smooth surface, resulting in smooth metal traces which minimizes high-frequency skin effect loss; d) The coefficient of thermal expansion can be matched to the CMOS die, i.e., the switching circuitry 218, 220, 222, minimizing stresses; e) low glass thermal conductivity, providing thermal isolation among dies; f) High local thermal conductivity by copper (Cu) through TGVs, allowing efficient die cooling.

In an exemplary embodiment, the high port count switching apparatus 200 includes a plurality of switching circuits 218, 220, 222 disposed on a glass interposer 214, wherein the plurality of switching circuits 218, 220, 222 each include cross-point switches configured to perform switching at a full signal rate; and a plurality of optical transceivers 216 disposed on the glass interposer 214 and communicatively coupled to the plurality of switching circuits 218, 220, 222. A portion of the plurality of switching circuits 218, 220, 222 are attached to the glass interposer 14, and wherein the plurality of switching circuits 218, 220, 222 are interconnected in a Clos-type switch. The switching circuits may be flip-chip attached or positioned in glass voids or wells to provide a substantially planarized arrangement between the circuit and corresponding on-glass transmission lines. The plurality of optical transceivers 216 is directly attached to the glass interposer 214 to provide low-loss RF connections. The plurality of optical transceivers 216 is attached to the glass interposer 214 through RF sockets. The plurality of optical transceivers 216 and the plurality of switching circuits 218, 220, 222 are interconnected to one another via an RF redistribution layer on the glass interposer 214, wherein the RF redistribution layer has a very low loss at high frequencies.

In an embodiment, a cross-point switch system 200 forming an adaptive communication network 20 between a plurality of switches 30 includes a plurality of ports 216 connected to the plurality of switches 30, wherein the plurality of switches 30 are connected to one another via a Port Aggregation Group (PAG) 50 including multiple ports with the same set of endpoints between two switches; and a switch fabric 218, 220, 222 configured to connect the plurality of ports 216 between one another, wherein the switch fabric is configured to rearrange bandwidth in a PAG 50 due to congestion thereon without packet loss. The multiple ports in the PAG 50 are filled in a sequential order by the two switches to keep ports free to rearrange the bandwidth. The adaptive communication network 20 is a flat-topology packet network with the plurality of switches including Top of Rack (TOR) switches at edges and the cross-point switch system 200 in-between. Each the plurality of switches 30 can be connected to a small subset of the plurality of switches in a pseudo-random manner.

The cross-point switch system 200 can be configured to detect which ports are carrying traffic and which are empty and used to rearrange the bandwidth. The cross-point switch system 200 detects the ports based on an IDLE signal transmitted by a switch on a port. The cross-point switch system 200 detects congestion on a PAG 50, determines if there is available bandwidth to expand the PAG 50, rearranges the bandwidth to expand the PAG 50, and notifies associated switches to adjust the PAG 50. The cross-point switch system 200 can be implemented using a plurality of cross-point switches 40B with inter-switch coordination 100 to provide link occupancy rates.

Example TOR Switch

Figure 18:
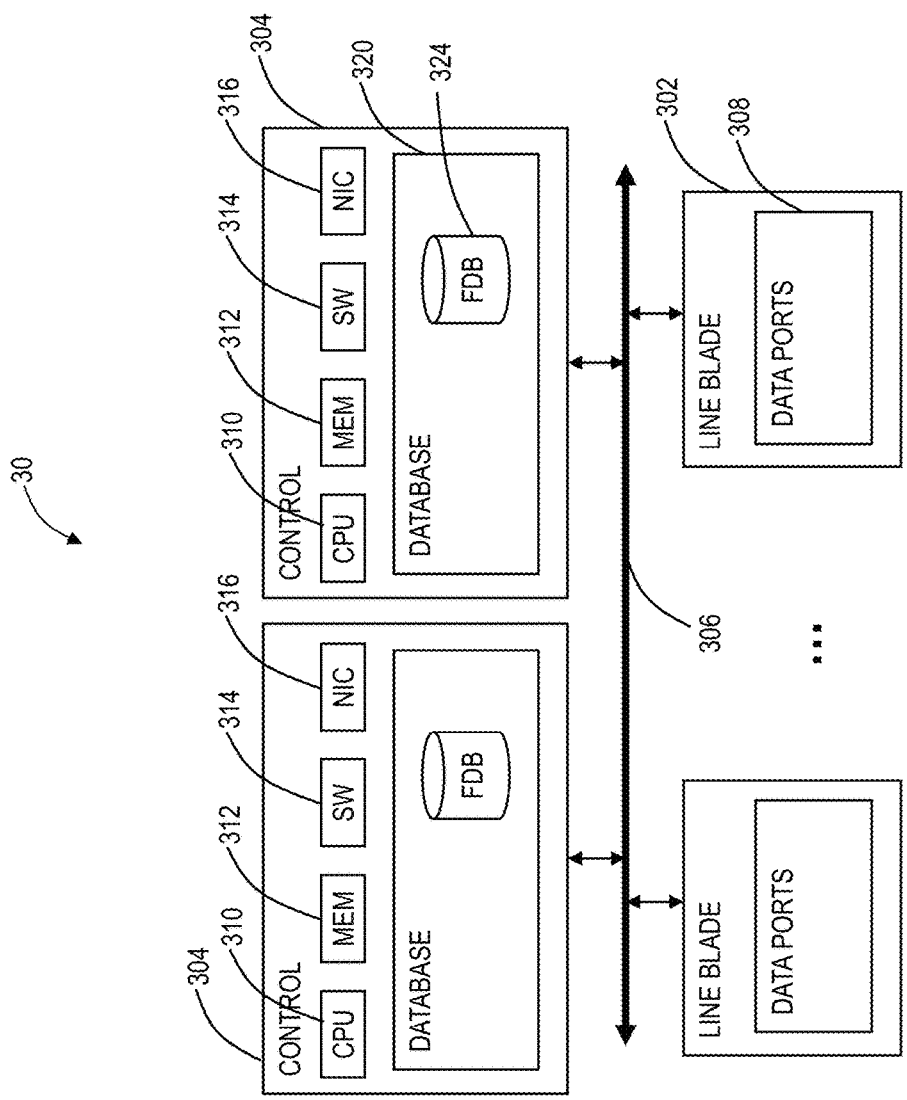
FIG. 18 is a block diagram of an example implementation of a TOR switch.

FIG. 18 is a block diagram of an example implementation of a TOR switch 30. The TOR switch 30 can include one or more blades 302, 304 interconnected via an interface 306. The blades 302, 304 are also known as line cards, line modules, circuit packs, pluggable modules, etc. and generally refer to components mounted within a chassis, shelf, etc. of a data switching device, i.e., the TOR switch 30. Alternatively, the functionality of each of the blades 302, 304 may be integrated into a single module such as in a layer two switch integrated within an optical network element. Further, the functionality of each of the blades 302, 304 may be integrated into a single hardware device, such as a pizza box switch. That is, the blades 302, 304 represent functionality and various hardware, and physical implementations may vary.

Each of the blades 302, 304 may include numerous electronic devices and optical devices mounted on a circuit board along with various interconnect including interfaces to the chassis, shelf, etc. Two example blades are illustrated with line blades 302 and control blades 304. The line blades 302 generally include data ports 308 such as a plurality of Ethernet ports. For example, the line blade 302 may include a plurality of physical ports disposed on an exterior of the blade 302 for receiving ingress/egress connections. Additionally, the line blades 302 may include switching components to form a switching fabric via the backplane 306 between all of the data ports 308 allowing data traffic to be switched between the data ports 308 on the various line blades 302. The switching fabric is a combination of hardware, software, firmware, etc. that moves data coming into the TOR switch 30 out by the correct port 308 to the next network element. The switching fabric includes switching units, or individual boxes, in a node; integrated circuits contained in the switching units; and programming that allows switching paths to be controlled.

The control blades 304 include a microprocessor 310, memory 312, software 314, and a network interface 316. Specifically, the microprocessor 310, the memory 312, and the software 314 may collectively control, configure, provision, monitor, etc. the TOR switch 30. The network interface 316 may be utilized to communicate with an element manager, a network management system, etc. Additionally, the control blades 304 may include a database 320 that tracks and maintains provisioning, configuration, operational data and the like. The database 320 may include a forwarding database (FDB) 322. In this example, the TOR switch 30 includes two control blades 304 which may operate in a redundant or protected configuration such as 1:1, 1+1, etc. In general, the control blades 304 maintain dynamic system information including Layer 2 forwarding databases, protocol state machines, and the operational status of the ports 308 within the TOR switch 30.

In the adaptive communication 20 architecture, the TOR switch 30 can be a standard packet switch, configured with additional network facing ports (vs. server facing ports).

In an embodiment, a TOR switch 30 in an adaptive communication network 20 includes a plurality of ports 308 including network-facing ports connected to additional TOR switches 30 in the adaptive communication network 20 via a cross-point switch system 40 and server-facing ports connected to servers 14, wherein the network-facing ports are connected to each of the additional TOR switches 30 via a Port Aggregation Group (PAG) 50 including multiple ports; a switch fabric configured to switch packets between the plurality of ports 308, wherein the switch fabric is configured to provide packets to each PAG 50 in a sequential order of the multiple ports to keep ports free to rearrange the bandwidth. The cross-point switch system 40 is configured to rearrange bandwidth in a PAG 50 due to congestion thereon without packet loss. The adaptive communication network 20 is a flat-topology packet network with the TOR switch 30, the additional TOR switches 30, and another set of TOR switches 30 at edges and the cross-point switch system 40 in-between.

The TOR switch 30 can be connected to a small subset of TOR switches including the additional TOR switches in a pseudo-random manner and connected to the another set of TOR switches via multiple hops. The cross-point switch system 40 can be configured to detect which ports are carrying traffic and which are empty and used to rearrange the bandwidth. The TOR switch 30 can be configured to transmit an IDLE signal on a port without traffic to the cross-point switch system 40. The cross-point switch system 40 can detect congestion on a PAG 50, determines if there is available bandwidth to expand the PAG, rearranges the bandwidth to expand the PAG, and notifies the TOR switch to adjust the PAG. The cross-point switch system 40 can be implemented using a plurality of cross-point switches 40B with inter-switch coordination 100 to provide link occupancy rates.

Adaptive Communication Process

Figure 19:
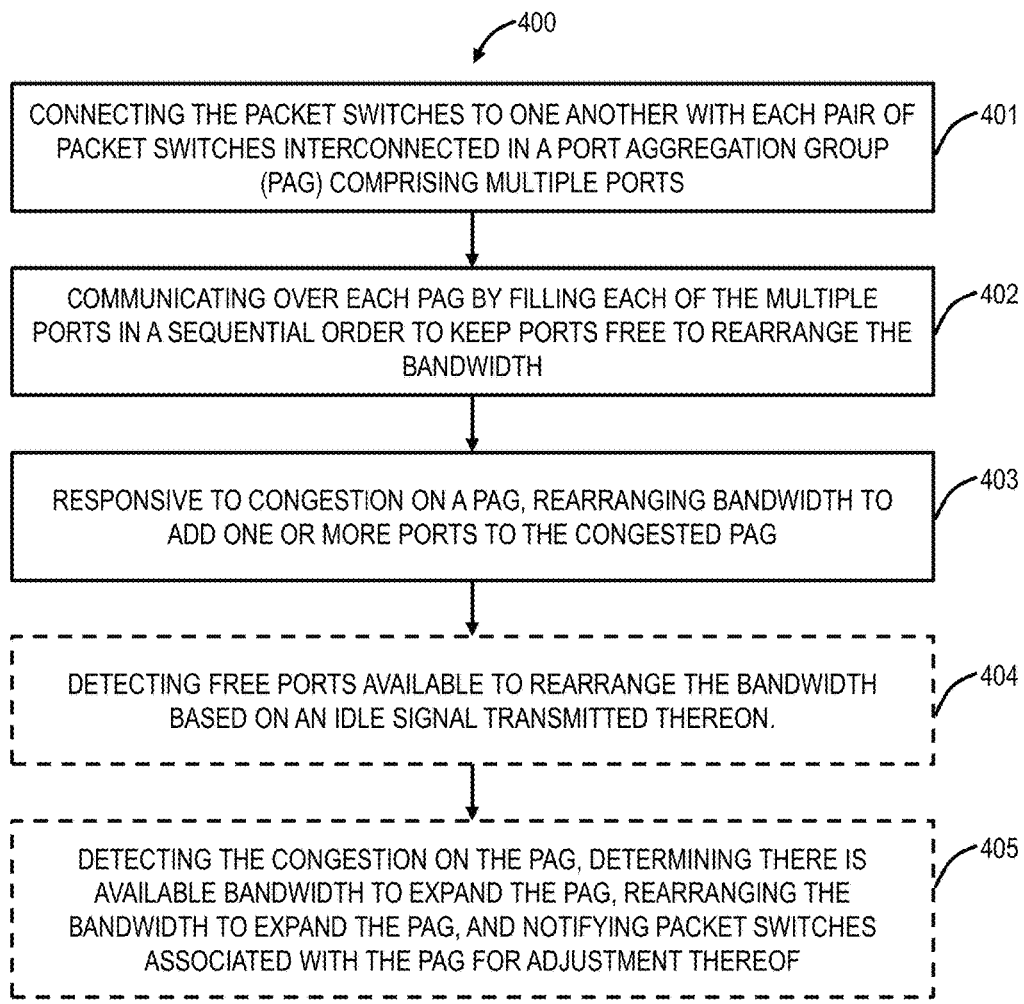
FIG. 19 is a flowchart of a process implementing an adaptive communication network between a plurality of Top of Rack (TOR) switches.

FIG. 19 is a flowchart of a process 400 implementing an adaptive communication network between a plurality of packet switches. The process 400 includes connecting the packet switches to one another with each pair of packet switches interconnected in a Port Aggregation Group (PAG) including multiple ports (step 401); communicating over each PAG by filling each of the multiple ports in a sequential order to keep ports free to rearrange the bandwidth (step 402); and, responsive to congestion on a PAG, rearranging bandwidth to add one or more ports to the congested PAG (step 403). The adaptive communication network can be a flat-topology packet network with the packet switch, the additional packet switches, and another set of packet switches at edges and the cross-point switch system in-between. The process 400 can further include detecting free ports available to rearrange the bandwidth based on an IDLE signal transmitted thereon (step 404). The process 400 can further include detecting the congestion on the PAG, determining there is available bandwidth to expand the PAG, rearranging the bandwidth to expand the PAG, and notifying packet switches associated with the PAG for adjustment thereof (step 405).

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A cross-point switch system forming an adaptive communication network between a plurality of switches, the cross-point switch comprising:
a plurality of ports connected to the plurality of switches, wherein the plurality of switches are connected to one another via a Port Aggregation Group (PAG) comprising multiple ports with a same set of endpoints between two switches; and
a cross-point switch fabric configured between the plurality of ports and configured to connect the plurality of ports between one another,
wherein the cross-point switch fabric is configured to rearrange bandwidth in a PAG due to congestion thereon without packet loss.

2. The cross-point switch system of claim 1, wherein the multiple ports in the PAG are filled in a sequential order by the switches to keep ports free to rearrange the bandwidth.

3. The cross-point switch system of claim 1, wherein the adaptive communication network is a packet network with the plurality of switches comprising packet switches at edges and the cross-point switch system in-between.

4. The cross-point switch system of claim 3, wherein each of the plurality of switches are connected to a small subset of the plurality of switches in a mesh network configuration.

5. The cross-point switch system of claim 1, wherein the cross-point switch system is configured to detect which ports are carrying traffic and which are empty and used to rearrange the bandwidth.

6. The cross-point switch system of claim 5, wherein the cross-point switch system detects the ports based on an IDLE signal transmitted by a switch on a port.

7. The cross-point switch system of claim 1, wherein the cross-point switch system detects congestion on a PAG, determines if there is available bandwidth to expand the PAG, rearranges the bandwidth to expand the PAG, and notifies associated switches to adjust the PAG.

8. The cross-point switch system of claim 1, wherein the cross-point switch system is implemented using a plurality of cross-point switches with inter-switch coordination to provide link occupancy rates.

9. A packet switch in an adaptive communication network, the packet switch comprising:
a plurality of ports comprising network-facing ports connected to additional packet switches in the adaptive communication network via a cross-point switch system and server-facing ports connected to servers, wherein the network-facing ports are connected to each of the additional packet switches via a Port Aggregation Group (PAG) comprising multiple ports;
a switch fabric configured to switch packets between the plurality of ports,
wherein the switch fabric is configured between the plurality of ports and is configured to provide packet flows to each port in a PAG in an order to fill up port queue to a specified threshold before using next available port to keep ports free to rearrange the bandwidth.

10. The packet switch of claim 9, wherein the cross-point switch system is configured to rearrange bandwidth in a PAG due to congestion thereon without packet loss.

11. The packet switch of claim 9, wherein the adaptive communication network is a flat-topology packet network with the packet switch, the additional packet switches, and another set of packet switches at edges and the cross-point switch system in-between.

12. The packet switch of claim 11, wherein the packet switch is connected to a small subset of packet switches comprising the additional packet switches in a mesh network configuration and connected to the another set of packet switches via multiple hops.

13. The packet switch of claim 11, wherein the cross-point switch system is configured to detect which ports are carrying traffic and which are empty and used to rearrange the bandwidth.

14. The packet switch of claim 13, wherein the packet switch is configured to transmit an IDLE signal on a port without traffic to the cross-point switch system.

15. The packet switch of claim 9, wherein the cross-point switch system detects congestion on a PAG, determines if there is available bandwidth to expand the PAG, rearranges the bandwidth to expand the PAG, and notifies the packet switch to adjust the PAG.

16. The packet switch of claim 11, wherein the cross-point switch system is implemented using a plurality of cross-point switches with inter-switch coordination to provide link occupancy rates.

17. A method implementing an adaptive communication network between a plurality of packet switches, the method comprising:
providing a switch fabric configured between multiple ports;
connecting the packet switches to one another with each pair of packet switches interconnected in a Port Aggregation Group (PAG) comprising multiple ports;
communicating over each PAG by filling each of the multiple ports to a specified queue threshold before using next available port to keep ports free to rearrange the bandwidth; and
responsive to congestion on a PAG, rearranging bandwidth to add one or more ports to the congested PAG.

18. The method of claim 17, wherein the adaptive communication network is a flat-topology packet network with the packet switch, the additional packet switches, and another set of packet switches at edges and the cross-point switch system in-between.

19. The method of claim 17, further comprising:
detecting free ports available to rearrange the bandwidth based on an IDLE signal transmitted thereon.

20. The method of claim 17, further comprising:
dynamically adjusting the PAG for bandwidth management without centralized control.

* * * * *